United States Patent
Heidel et al.

(10) Patent No.: US 12,239,936 B2
(45) Date of Patent: Mar. 4, 2025

(54) HYDRATION OF GAS STREAMS

(71) Applicant: Carbon Engineering ULC, Squamish (CA)

(72) Inventors: Kenton Robert Heidel, Squamish (CA); David St. Angelo, Squamish (CA); Jane Anne Ritchie, Calgary (CA)

(73) Assignee: Carbon Engineering ULC, Squamish (CA)

(*) Notice: Subject to any disclaimer, the term of this patent is extended or adjusted under 35 U.S.C. 154(b) by 1140 days.

(21) Appl. No.: 17/048,504

(22) PCT Filed: Apr. 16, 2019

(86) PCT No.: PCT/US2019/027698
§ 371 (c)(1),
(2) Date: Oct. 16, 2020

(87) PCT Pub. No.: WO2019/204320
PCT Pub. Date: Oct. 24, 2019

(65) Prior Publication Data
US 2021/0101107 A1     Apr. 8, 2021

Related U.S. Application Data

(60) Provisional application No. 62/658,679, filed on Apr. 17, 2018.

(51) Int. Cl.
*B01D 53/14* (2006.01)
*B01D 53/78* (2006.01)

(52) U.S. Cl.
CPC ........ *B01D 53/1475* (2013.01); *B01D 53/78* (2013.01); *B01D 2251/304* (2013.01);
(Continued)

(58) Field of Classification Search
CPC ............... B01D 53/1475; B01D 53/78; B01D 2251/304; B01D 2251/306;
(Continued)

(56) References Cited

U.S. PATENT DOCUMENTS 3,363,885 A * 1/1968 Meek ................. F28C 1/04
261/DIG. 11
3,707,277 A * 12/1972 Phelps ................. F28C 1/06
261/109
(Continued)

FOREIGN PATENT DOCUMENTS

CA          2734786        11/2017
CN        101091864        12/2007
(Continued)

OTHER PUBLICATIONS

Gulf Coop Council Examination Report in GCC Appln. No. 201937396, dated Nov. 25, 2021, 3 pages.
(Continued)

*Primary Examiner* — Dung H Bui
(74) *Attorney, Agent, or Firm* — Fish & Richardson P.C.

(57) ABSTRACT

Techniques for humidifying a gas stream using a hydration system includes directing a gas stream through a contact zone of at least one hydration system; directing a hydration solution into the contact zone using a pump; contacting the gas stream with the hydration solution; evaporating water from the hydration solution into the gas stream to form a humidified gas stream, transporting the humidified gas stream out of the at least one hydration system; and collecting the remaining hydration solution in a hydration solution collection basin below the contact zone. The at least one hydration system is fluidly coupled to at least one downstream process and the humidified gas stream from the at
(Continued)

least one hydration system is transported as a feed stream to the at least one downstream process.

31 Claims, 13 Drawing Sheets

(52) U.S. Cl.
CPC .. *B01D 2251/306* (2013.01); *B01D 2251/606* (2013.01); *B01D 2252/103* (2013.01); *B01D 2257/504* (2013.01); *B01D 2258/0283* (2013.01)

(58) Field of Classification Search
CPC ........ B01D 2251/606; B01D 2252/103; B01D 2257/504; B01D 2258/0283; B01D 1/0082; B01D 1/14; B01D 1/16; B01D 3/346; B01D 5/006; B01D 2251/604; B01D 2252/204; B01D 53/18; Y02A 20/124; F24F 3/1417; Y02C 20/40
See application file for complete search history.

(56) References Cited

U.S. PATENT DOCUMENTS

| | | | |
|---|---|---|---|
| 3,748,832 | A | 7/1973 | Furlong |
| 4,000,264 | A | 12/1976 | Nagano et al. |
| 4,031,180 | A | 6/1977 | Bohanon |
| 4,049,399 | A | 9/1977 | Teller |
| 4,183,901 | A | 1/1980 | Ilardi et al. |
| 4,251,494 | A | 2/1981 | Say |
| 4,344,650 | A | 8/1982 | Pinsky et al. |
| 4,401,635 | A | 8/1983 | Frint |
| 4,632,760 | A | 12/1986 | Hanson et al. |
| 4,994,210 | A | 2/1991 | Lucero |
| 5,283,054 | A | 2/1994 | Copenhafer et al. |
| 5,316,744 | A * | 5/1994 | Haehn ................ B01D 53/1487 422/256 |
| 5,364,604 | A | 11/1994 | Spink et al. |
| 5,484,471 | A * | 1/1996 | Schwab ................ B01D 47/10 95/200 |
| 5,582,683 | A | 12/1996 | Bonsu et al. |
| 5,679,131 | A | 10/1997 | Obushenko |
| 5,695,548 | A | 12/1997 | Truta |
| 5,879,434 | A | 3/1999 | Kiss |
| 6,070,860 | A * | 6/2000 | Kinney, Jr. ................ F28C 1/04 261/DIG. 11 |
| 6,409,157 | B1 | 6/2002 | Lundin |
| 6,428,759 | B1 | 8/2002 | Smith et al. |
| 6,524,843 | B1 | 2/2003 | Blais et al. |
| 6,582,498 | B1 | 6/2003 | Sass et al. |
| 6,840,987 | B1 | 1/2005 | Gonzalez et al. |
| 7,214,290 | B2 | 5/2007 | Duesel, Jr. et al. |
| 7,297,182 | B2 | 11/2007 | Ray et al. |
| 7,314,847 | B1 | 1/2008 | Siriwardare |
| 7,318,857 | B2 | 1/2008 | Ray et al. |
| 7,329,298 | B1 | 2/2008 | Hasinski |
| 7,731,781 | B2 | 6/2010 | Berry et al. |
| 7,833,010 | B2 | 11/2010 | Baker et al. |
| 7,906,089 | B2 | 3/2011 | Gosh et al. |
| 8,119,091 | B2 | 2/2012 | Keith et al. |
| 8,273,158 | B2 | 9/2012 | Jarrier |
| 8,574,354 | B2 | 11/2013 | Keith et al. |
| 8,602,397 | B2 * | 12/2013 | Daley .................. F28C 3/04 261/DIG. 11 |
| 8,966,924 | B2 * | 3/2015 | Pichai .................. F28C 1/14 62/310 |
| 9,095,813 | B2 | 8/2015 | Keith et al. |
| 9,550,142 | B2 | 1/2017 | Roestenberg et al. |
| 9,751,039 | B2 | 9/2017 | Gebald et al. |
| 10,421,039 | B2 | 9/2019 | Heidel et al. |
| 2001/0022952 | A1 | 9/2001 | Rau et al. |
| 2003/0205039 | A1 | 11/2003 | Terlson |
| 2004/0094037 | A1 | 5/2004 | Maleeny et al. |
| 2006/0000196 | A1 | 1/2006 | Beier et al. |
| 2006/0051274 | A1 | 3/2006 | Wright et al. |
| 2006/0186562 | A1 | 8/2006 | Wright et al. |
| 2007/0157806 | A1 | 7/2007 | Cash |
| 2008/0011161 | A1 | 1/2008 | Finkenrath et al. |
| 2008/0031801 | A1 | 2/2008 | Lackner et al. |
| 2009/0053040 | A1 | 2/2009 | Chillar |
| 2010/0034724 | A1 | 2/2010 | Keith et al. |
| 2010/0064890 | A1 | 3/2010 | Keith et al. |
| 2011/0079504 | A1 | 4/2011 | Govindan et al. |
| 2011/0092355 | A1* | 4/2011 | Iijima ................ B01D 53/1462 502/55 |
| 2011/0239862 | A1* | 10/2011 | Davydov ................ B01D 53/18 95/151 |
| 2012/0195816 | A1* | 8/2012 | Dube .................... B01D 53/75 423/220 |
| 2013/0095016 | A1 | 4/2013 | Miyagawa et al. |
| 2013/0204066 | A1* | 8/2013 | Chretien .............. B01D 53/185 585/860 |
| 2014/0123621 | A1* | 5/2014 | Driessens .............. B01D 46/10 29/889.22 |
| 2014/0284002 | A1 | 9/2014 | Sparrow |
| 2015/0330710 | A1* | 11/2015 | Curtis ...................... F28C 1/16 261/29 |
| 2015/0336044 | A1 | 11/2015 | Keith et al. |
| 2016/0096743 | A1* | 4/2016 | Duesel, Jr. ............. C02F 1/042 159/47.3 |
| 2016/0303513 | A1 | 10/2016 | Bijl et al. |
| 2016/0362307 | A1* | 12/2016 | Shiner .................... C02F 1/048 |
| 2017/0203249 | A1 | 7/2017 | Gebald et al. |
| 2017/0246588 | A1 | 8/2017 | Roestenberg et al. |
| 2017/0354925 | A1 | 12/2017 | Heidel |
| 2019/0336909 | A1 | 11/2019 | Keith |
| 2019/0344217 | A1 | 11/2019 | Heidel |
| 2019/0374898 | A1* | 12/2019 | Panaccione ............. B01D 47/14 |

FOREIGN PATENT DOCUMENTS

| | | |
|---|---|---|
| CN | 101128248 A | 2/2008 |
| CN | 102202766 A | 9/2011 |
| CN | 106621705 A | 5/2017 |
| EP | 2782657 B1 | 12/2016 |
| EP | 2321034 | 1/2018 |
| IN | 2007 | 8/2007 |
| JP | 2014018776 A | 2/2014 |
| KR | 1020130137473 A | 12/2013 |
| MX | 299407 | 5/2012 |
| WO | WO2006009600 | 1/2006 |
| WO | WO2006034339 | 3/2006 |
| WO | WO2006084008 | 8/2006 |
| WO | WO2007075399 | 7/2007 |
| WO | WO200842919 | 4/2008 |
| WO | WO2010022339 | 2/2010 |
| WO | WO2017009241 | 1/2017 |
| WO | WO2017148782 | 9/2017 |

OTHER PUBLICATIONS

Communication pursuant to Article 94(3) EPC in European Patent Application No. 19788037.0, dated Jan. 2, 2024, 5 pages.
Baciocchi et al., "Process design and energy requirement for the capture of carbon dioxide from air," Chem. Eng. Proc., 2006, 45:1047-1058.
Canadell et al., "Contributions to accelerating atmospheric CO2 growth from economic activity, carbon intensity, and efficiency of natural sinks," Proc. Natl. Acad. Sci. USA, 2007, 104(47):18866-18870.
Chen and van Heiningen, "Kinetics of the direct causticizing reaction between sodium carbonate and titanium dioxide or sodium tri-titanate," J. Pulp Paper Sci., 2006, 32(4):245-251.
Chinese Decision on Rejection, Application No. 200980137997.2, issued Mar. 12, 2014, 22 pages.
Chinese First Office Action, Application No. 200980137997.2, issued Jan. 28, 2013, 13 pages.
Chinese First Office Action, Application No. 201610825390.5, issued Nov. 1, 2018, 13 pages.

(56) References Cited

OTHER PUBLICATIONS

Chinese Second Office Action, Application No. 200980137997.2, issued Aug. 26, 2013, 26 pages.
Covey, "Development of the direct alkali recovery system and potential application," Pulp Pap. Canada, 1982, 83(12):T350-T354.
European Office Action, Application No. 09808878.4, dated Dec. 20, 2012, 5 pages.
European Search Report, Application No. 09767848.6, dated Feb. 17, 2012, 7 pages.
Hoddenbagh et al., "Borate causticizing: a cost effective technology," Pulp Pap. Canada, 2002, 103(11):T283-T289.
International Preliminary Report on Patentability and Written Opinion of the International Searching Authority from International Application No. PCT/US2009/047999, mailed Dec. 21, 2010, 6 pages.
International Preliminary Report on Patentability and Written Opinion of the International Searching Authority from International Application No. PCT/US2009/054626, mailed Feb. 22, 2011, 6 pages.
International Search Report and Written Opinion of the International Searching Authority, PCT Application Serial No. PCT/US2009/0054626, Apr. 5, 2010, 11 pp.
International Search Report and Written Opinion of the International Searching Authority, PCT Application Serial No. PCT/US2009/047999, Jan. 29, 2010, 11 pp.
Kiiskilä, "Recovery of sodium hydroxide from alkaline pulping liquors by smelt causticizing, Part II. Recations between sodium carbonate and titanium dioxide," Paperi ja Puu, Papper och Trä, 1979, 5:394-401.
Kiiskilä, "Recovery of sodium hydroxide from alkaline pulping liquors by smelt causticizing, Part III. Alkali distribution in titanium dioxide causticizing," Paperi ja Puu, Papper och Trä, 1979, 6:453-464.
Kutare, Examination Report, Indian Application No. 1814/CHENP/2011, dated Apr. 13, 2018, 5 pages.
Lackner et al., "Carbon dioxide from air," 24th Annual Technical Conference on Coal Utilization, 1999, Clearwater, FL, 12 pages.
Maddern, "Mill-scale development of the DARS direct causticization process," Pulp Pap. Candada, 1986, 87(10):T395-T399.
Mahmoudkhani and Keith, "Low-energy sodium hydroxide recovery for CO2 capture from atmospheric air-Thermodynamic analysis," Int. J. Greenhouse Gas Control, 2009, 3:376-384.
Mahmoudkhani et al. "Low energy packed tower and caustic recovery for direct capture of CO2 from air," Energy Procedia, 2009, 1:1535-1542.
Marley, Variflow nozzle cup, SPX Cooling Technologies, Inc., SP-VF, Dec. 2016, 2 pgs.
Nohlgren et al., "Model study of the direct causticization reaction between sodium trititanate and sodium carbonate," The Canadian Journal of Chemical Engineering, Jun. 2000, vol. 78, pp. 529-539.
Nohlgren, "Recovery of kraft black liquor with direct causticization using titanates," Ph.D. Thesis, Lulea University of Technology, Lulea, Sweden, 2002, 164 pages.
Non-Final Office Action dated Aug. 2, 2013 mailed from USPTO for U.S. Appl. No. 12/545,579, 16 pages.
Non-Final Office Action dated Jan. 6, 2011 mailed from USPTO for U.S. Appl. No. 12/488,230, 14 pages.
Non-Final Office Action dated May 17, 2011 mailed from USPTO for U.S. Appl. No. 12/545,579, 16 pages.
Palm et al., "Kinetic study of the direct causticization reaction involving titanates and titanium dioxide," Chemical Engineering Journal. 1997, vol. 68, pp. 87-94. (Same as Above).
PCT International Preliminary Report on Patentability in International Appln. No. PCT/US2019/027698, dated Oct. 20, 2020, 8 pages.
Restriction Requirement dated Mar. 11, 2011 mailed from USPTO for U.S. Appl. No. 12/545,579, 8 pages.
Sinquefield et al., "Borate auto-causticization for low and high temperature black liquor gasification," International Chemical Recovery Conference, Jun. 6-10, 2004, Charleston, SC, 6 pages.
Spector and Dodge, "Removal of carbon dioxide from atmospheric air," Trans. Am. Inst. Chem. Eng., 1946, 42:827-848.
Stolaroff et al., "Carbon dioxide capture from atmospheric air using sodium hydroxide spray," Environ. Sci. Technol., 2008, 42:2728-2735.
Supplementary European Search Report, Application No. 09808878.4, dated Oct. 25, 2012, 4 pages.
Tepe and Dodge, "Absorption of carbon dioxide by sodium hydroxide solutions in a packed column," Trans. Am. Inst. Chem. Eng., 1943, 39:255-276.
Variable Flow Over Cooling Towers for Energy Savings, Connecticut ASHRAE Chapter, Nov. 2016, retrieved from the Internet: URL<http://ctashrae.org/downloads/Meeting_Presentations/variable_flow_presentation_connecticut_ashrae.pdf > 46 pgs.
Yusuf and Cameron, "Decarbonization reactions between sodium metaborate and sodium carbonate," Ind. Eng. Chem. Res., 2004, 43:8148-8154.
Zeman and Lackner, "Capturing carbon dioxide directly from the atmosphere," World Resource Review, 2004, 16(2):157-172.
Zeman, "Direct Extraction of CO2 from Air, a Fixed Solution for a Mobile Problem," The First Regional Symposium on Carbon Management, May 23, 2006, Dhahran, Saudi Arabia, 12 pages.
Zeman, "Energy and material balance of CO2 capture from ambient air," Environ. Sci. Technol., 2007, 41(21):7558-7563.
Zeng and van Heiningen, "Pilot fluidized-bed testing of kraft black liquor gasification and its direct causticization with TiO2," J. Pulp Paper Sci., 1997, 23(11):J511-J516.
Zeng et al., "A Mathematic Model for Direct Causticization of Na2C03 with Ti02 in a Semi-batch Reactor," The Canadian Journal of Chemical Engineering, Oct. 2002, vol. 80, pp. 948-953.
Zou, "Recovery of kraft black liquor including direct causticization," Ph.D. Thesis, McGill University, Montreal, Quebec, 1991, 231 pages.
European Extended Search Report in EP Appln. No. 19788037.0, dated Apr. 23, 2021, 8 pages.

* cited by examiner

HYDRATION OF GAS STREAMS

CROSS REFERENCE TO RELATED APPLICATIONS

This application is a U.S. National Stage Application under 35 U.S.C. § 371 and claims the benefit of International Patent Application No. PCT/US2019/027698, filed on Apr. 16, 2019 which claims the benefit of priority to U.S. Provisional Patent Application No. 62/658,679, filed on Apr. 17, 2018, the disclosures of which are incorporated herein by reference in their entirety.

TECHNICAL FIELD

This disclosure describes systems, apparatus, and methods for gas-liquid contacting for the humidification of gases.

BACKGROUND

Global water resources are seeing an increase in challenges including for example mismanagement and/or overuse, pollution, and changes in availability. Addressing these challenges with long term management strategies means that consumption of such water in industrial processes needs to be minimized or eliminated. This can be accomplished in part by developing methods and processes that enable usage of alternate water sources.

SUMMARY

In an example implementations, a method for humidifying a gas stream using a hydration system includes directing a gas stream through a contact zone of at least one hydration system, directing a hydration solution into the contact zone using a pump, contacting the gas stream with the hydration solution, evaporating water from the hydration solution into the gas stream to form a humidified gas stream, transporting the humidified gas stream out of the at least one hydration system, and collecting the remaining hydration solution in a hydration solution collection basin below the contact zone. The at least one hydration system is fluidly coupled to at least one downstream process and the humidified gas stream from the at least one hydration system is transported as a feed stream to the at least one downstream process.

In an aspect combinable with the example implementation, the contact zone includes a packing material, and the method further includes wetting at least a portion of the packing material with the hydration solution.

In another aspect combinable with any of the previous aspects, the packing material includes at least one of loose fill or structured fill.

In another aspect combinable with any of the previous aspects, the at least one downstream process includes a process solution, a process solution evaporator unit, and a condenser and collection unit configured to evaporate and collect water from at least a portion of the process solution.

Another aspect combinable with any of the previous aspects further includes isolating the hydration solution from the downstream process.

In another aspect combinable with any of the previous aspects, at least a portion of the hydration solution includes at least one of non-potable water, off-spec water, brackish water, saline water, sea water, waste water, gray water, rain water, storm water, non-process water, or a combination thereof.

Another aspect combinable with any of the previous aspects further includes controlling a temperature of the hydration solution.

Another aspect combinable with any of the previous aspects further includes supplying heat to the at least one hydration system.

In another aspect combinable with any of the previous aspects, the supplied heat is supplied from the downstream process.

In another aspect combinable with any of the previous aspects, the contact zone includes a wetted surface area within the contact zone volume, and the method further includes controlling a rate and a direction of hydration solution flow into the contact zone, and varying a ratio of the wetted surface area to contact zone volume within a range of between 0 $m^2/m^3$ and 2000 $m^2/m^3$.

Another aspect combinable with any of the previous aspects further includes separating solids from the hydration solution.

In another aspect combinable with any of the previous aspects, separating solids from the hydration solution includes operating the hydration solution collection basin fluidly coupled to the at least one hydration system and a mechanical removal system and at least one solid collection zone, flowing a mixed stream of liquids and solids into the hydration solution collection basin, and collecting and processing the solids from the mixed stream with the mechanical removal system and the at least one solid collection zone.

In another aspect combinable with any of the previous aspects, the mechanical removal system includes at least one of an auger, screw conveyor, progressive cavity pump, screw pump, high density solids pump, or reciprocating pump.

Another aspect combinable with any of the previous aspects further includes reducing drift of the humidified gas stream.

In another aspect combinable with any of the previous aspects, reducing drift includes flowing at least a portion of the humidified gas stream through a frame and drift assembly that includes a pre-fabricated mechanical frame coupled to a drift eliminator material with substantially no air gaps between the drift eliminator material and mechanical frame.

In another aspect combinable with any of the previous aspects, reducing drift further includes coupling the frame and drift assembly to the at least one hydration system.

In another aspect combinable with any of the previous aspects, the frame and drift assembly further includes a flexible sealant coupled to at least one of the drift eliminator material or the pre-fabricated mechanical frame.

Another aspect combinable with any of the previous aspects further includes capturing $CO_2$ from at least one of a dilute gas source or a point source.

In another aspect combinable with any of the previous aspects, the dilute gas source includes air, and the point source includes at least one of a flue gas, reservoir gas, waste gas, exhaust flue stack gas from power generation processes, exhaust flue stack gas from concrete production processes, or exhaust from a combustion process.

In another aspect combinable with any of the previous aspects, the downstream process includes a bioreactor system.

In another aspect combinable with any of the previous aspects, directing the gas stream includes circulating the gas stream with one or more of a fan or blower.

In another aspect combinable with any of the previous aspects, capturing CO2 includes capturing the $CO_2$ in a dual cross flow contactor.

Another aspect combinable with any of the previous aspects further includes turning on and turning off at least one of the at least one hydration system as part of controlling the at least one downstream process.

Another aspect combinable with any of the previous aspects further includes controlling at least a portion of the at least one downstream process by adjusting at least one of a temperature of the hydration solution, a direction or flow rate of hydration solution through the contact zone, or a flow of gas through the contact zone.

In another general implementation, an apparatus for humidifying a gas stream includes inlet ports arranged to receive at least one feed stream into a hydration housing vessel, a gas inlet section configured to receive at least one gas feed stream into the hydration housing vessel, a hydration solution having a capacity for hydrating at least one of the gas feed streams, a contact zone configured for gas-liquid contact, a solution distribution system including a pump and configured for flowing the hydrating solution over at least a portion of the contact zone, a hydration solution collection basin configured to receive the hydration solution leaving the contact zone, a drift elimination section configured to prevent hydration solution from leaving with a humidified gas stream, at least one outlet configured to dispense the humidified gas stream, and at least one outlet port configured to discharge at least a portion of the hydration solution. The inlet ports and gas inlet section are coupled to the hydration housing vessel, and the hydration housing vessel is coupled to the contact zone, the drift elimination section, the solution distribution system, the hydration solution collection basin, the at least one outlet and the at least one outlet port.

In an aspect combinable with the general implementation, the contact zone includes packing material.

In another aspect combinable with any of the previous aspects, the packing material includes at least one of loose fill or structured fill.

In another aspect combinable with any of the previous aspects, the apparatus is coupled to a downstream process, and at least a portion of a humidified gas stream exiting the apparatus is fluidly connected to the downstream process.

In another aspect combinable with any of the previous aspects, the drift elimination section is configured to isolate the hydration solution from the downstream process, and includes one or more of drift eliminators, inlet louvers, demisters, or a combination thereof.

In another aspect combinable with any of the previous aspects, the downstream process includes at least one of a fan or blower configured to move at least a portion of the humidified gas stream through the apparatus, and into the downstream process.

In another aspect combinable with any of the previous aspects, the downstream process includes a process solution, a process solution evaporator unit, and a condenser and collection unit configured to evaporate and collect water from at least a portion of the process solution.

In another aspect combinable with any of the previous aspects, one or more of the apparatus and the downstream process are fluidly connected to a water treatment and filtration system.

Another aspect combinable with any of the previous aspects further includes a temperature control system configured to control the temperature of the hydration solution, and the temperature control system includes at least one of a heat exchanger and a gas analysis unit.

In another aspect combinable with any of the previous aspects, the heat exchanger is configured to receive at least one heat stream, and the at least one heat stream includes heat from a downstream process.

In another aspect combinable with any of the previous aspects, the contact zone includes a wetted surface area within the contact zone volume, and the apparatus further includes a flow control system configured to control one or more of a flow rate and a flow direction of the hydration solution over the contact zone, and further configured to vary a ratio of the wetted surface area to contact zone volume within a range of between 0 $m^2/m^3$ and 2000 $m^2/m^3$.

In another aspect combinable with any of the previous aspects, the hydration solution collection basin includes at least one or more solid collection zones, and a solids transfer system coupled to the hydration solution collection basin and configured to remove solid material from the at least one or more solid collection zones.

In another aspect combinable with any of the previous aspects, the solids transfer system includes at least one of an auger, screw conveyor, progressive cavity pump, screw pump, high density solids pump, or reciprocating pump.

In another aspect combinable with any of the previous aspects, the hydration solution collection basin includes an inclined bottom basin area and a liquid level, and the inclined bottom basin area is sloped down towards the at least one or more solid collection zones.

In another aspect combinable with any of the previous aspects, the drift elimination section further includes a pre-fabricated mechanical frame, and a drift eliminator material coupled to the pre-fabricated mechanical frame.

Another aspect combinable with any of the previous aspects further includes a flexible sealant pressed against the drift eliminator material configured for substantially no air gaps between the hydration housing vessel and the drift eliminator material.

In another aspect combinable with any of the previous aspects, the hydration solution includes non-potable water, off-spec water, brackish water, saline water, sea water, waste water, gray water, rain water, storm water, non-process water, or a combination thereof.

In another aspect combinable with any of the previous aspects, the downstream process includes a system for capturing $CO_2$ from at least one of a dilute gas source or a point source.

In another aspect combinable with any of the previous aspects, the dilute gas source includes air, and the point source includes at least one of a flue gas, reservoir gas, waste gas, exhaust flue stack gas from power generation processes, exhaust flue stack gas from concrete production processes, or exhaust from a combustion process.

In another aspect combinable with any of the previous aspects, the downstream process includes a bioreactor system.

In another aspect combinable with any of the previous aspects, at least one of the gas inlet section or the at least one outlet includes one or more of a fan or blower.

In another aspect combinable with any of the previous aspects, the system for capturing $CO_2$ includes a dual cross flow contactor.

In another general implementation, a system for humidifying a gas stream includes a plurality of hydration apparatus, at least one downstream process fluidly coupled to at least one of the plurality of hydration apparatus, and a control system coupled to the plurality of hydration apparatus and the at least one downstream process and configured perform operations including selectively turning on and turning off the plurality of hydration apparatus as part of controlling the at least one downstream process. Each of the plurality of the hydration apparatus includes inlet ports arranged to receive at least one feed stream into a hydration housing vessel, a gas inlet section configured to receive at least one gas feed stream into the hydration housing vessel, the inlet ports and the gas inlet section coupled to the hydration housing vessel, a hydration solution having a capacity for hydrating at least one of the gas feed streams, a contact zone coupled to the hydration housing vessel and configured for gas-liquid contact, a solution distribution system coupled to the hydration housing vessel and including a pump configured for flowing the hydrating solution over at least a portion of the contact zone, a hydration solution collection basin coupled to the hydration housing vessel and configured to receive the hydration solution leaving the contact zone, a drift elimination section coupled to the hydration housing vessel and configured to prevent hydration solution from leaving with a humidified gas stream, at least one outlet coupled to the hydration housing vessel and configured to dispense the humidified gas stream, and at least one outlet port coupled to the hydration housing vessel and configured to discharge at least a portion of the hydration solution.

Another aspect combinable with any of the previous aspects further includes at least one process solution level measurement device coupled to at least one hydration apparatus and the at least one downstream process, the control system further configured to perform operations including receiving an output from the at least one process solution level measurement device, and controlling, based on the received output, a water content of the at least one downstream process.

In another aspect combinable with any of the previous aspects, each of the plurality of hydration apparatus further includes at least one temperature measurement device, the control system further configured to perform operations including receiving a temperature output from the at least one temperature measurement device, and controlling, based on the received temperature output, at least a portion of the at least one downstream process by adjusting at least one of a temperature of the hydration solution, a direction or flow rate of hydration solution through the contact zone, or a flow of gas through the contact zone.

In another aspect combinable with any of the previous aspects, the control system is further configured to perform operations including controlling a fan or blower positioned in at least one of the gas inlet section or the at least one outlet.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
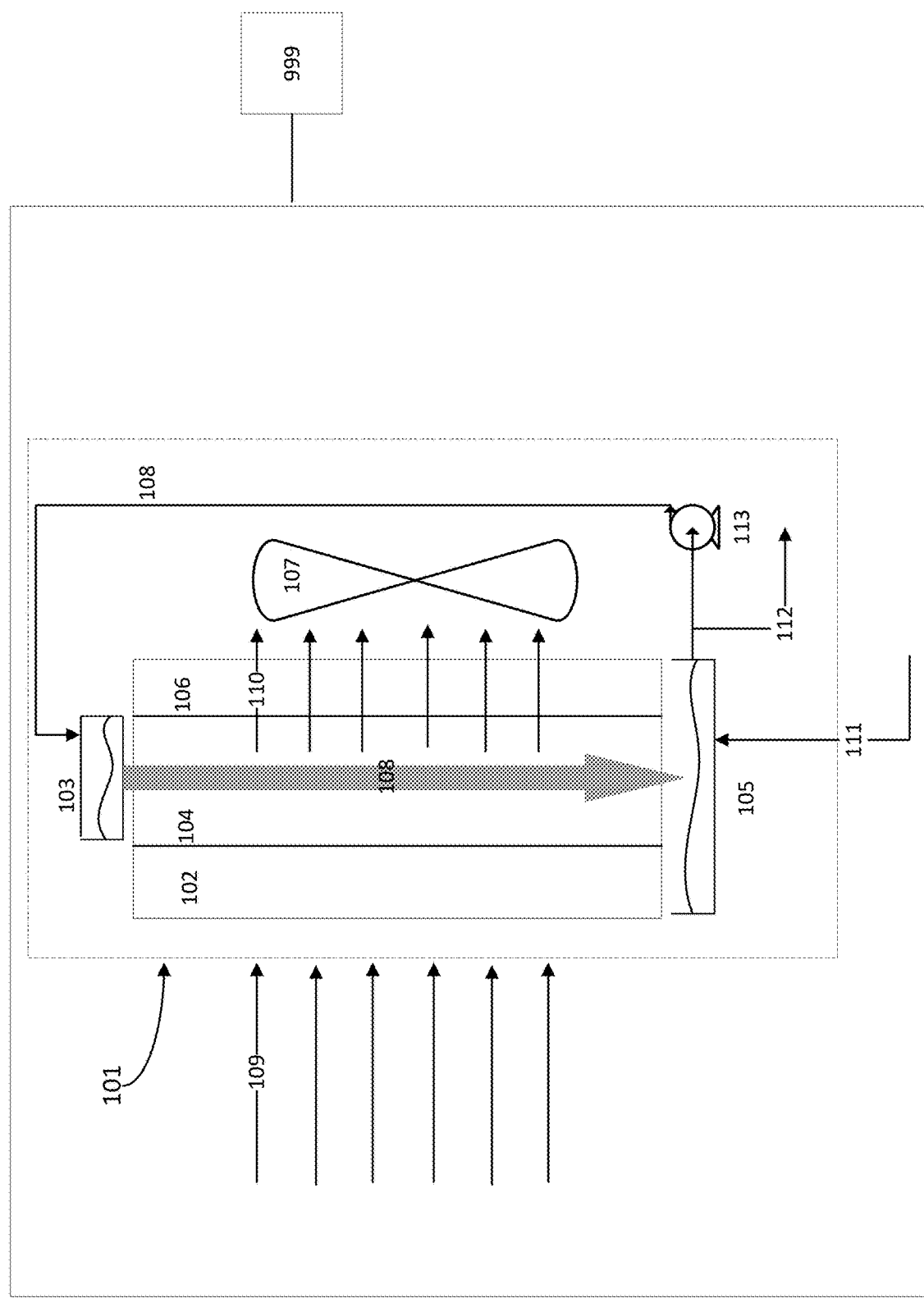
FIG. 1 depicts an example system and process for humidification of gases.

A number of innovations to existing gas-liquid contacting systems are needed to tailor them, and the system overall, to reduce water loss from the process solution, and consequently makeup water intake, without negatively impacting the key process solution and/or overall system capabilities or performance. These innovations may improve performance for process systems incorporating gas-liquid contacting wherein the gas directly contacts the main process solution, including but not limited to $CO_2$ capture applications, cooling water applications, and bioreactor applications.

Embodiments are described, wherein an independent gas-liquid contacting system, a hydration system, is configured with desirable features that accommodate efficient gas-liquid contacting and subsequent humidification or hydration of the gas stream prior to transfer of that gas stream to downstream process units, while preventing the contamination of downstream process solutions with non-water components from the hydration solution, and in some cases, reducing the pressure drop across the gas stream flow path.

Multiple embodiments of hydration units interfaced or fluidly coupled to different downstream processes are described, wherein the hydration unit enables downstream processes to reduce evaporative water losses without contaminating their process solution with the hydration solution.

Embodiments of a hydration unit interfaced with a Direct Air Capture (DAC) process is described, wherein the hydration unit enables the use of an evaporation and condensation system within the DAC system to redistribute process water and further reduce water treatment, disposal and makeup.

Embodiments utilizing temperature control and heat exchange are described, wherein the hydration solution temperature is manipulated or controlled (or both), through use of heat including waste process heat, to effect change in the water carrying capacity of the gas stream exiting the hydration unit and feeding downstream process unit(s).

A basin configuration is described, that promotes hydration solution collection and flow patterns within, such that suspended solids are able to settle out and migrate to one or more collection zones for removal.

A sealing configuration is described, wherein the sealant location and method of application prevents gas bypass around the drift elimination material within the hydration unit.

Embodiments utilizing control of flow of hydration solution over the contact zone are described, where the contact zone may include gas-liquid contacting components such as, hydration packing, wherein the volume of wetted contact zone is manipulated/controlled, effecting the amount of evaporation of water from the hydration solution into the gas stream, and impacting the overall pressure drop across the gas flow path, in order to accommodate a range of seasonal changes and their impact on evaporative losses from the system.

Alternate Water Sources for Industrial Applications

Alternate water sources can include any water source that is not normally used as a feed or makeup stream in a process, and can include sources such as non-potable, off-specification ("off-spec"), waste water, and the like.

Non-potable water, in some aspects, is water that has not been examined, properly treated and has not been approved by appropriate authorities for consumption. Non-potable water sources may include, for example, recycled water (e.g., re-use of process or wastewater treatment streams), storm water (e.g., run off from roads, hard surfaces and the like) or greywater (e.g., water generated from showers and laundry facilities), or a combination thereof. For instance, any type of water that is not fit for consumption without some type of treatment, including but not limited to filtration, boiling, reverse osmosis, chlorination, and the like, can be non-potable water.

Off-spec water, in some aspects, is water that is unfit for use in an intended application or process, due to containing levels of specific components that are outside of the normal acceptable range for that process. Depending on the process specifications, there may be types or levels of specific components that are incompatible with the process and should be avoided or minimized in order to maintain proper operation of the process. The presence (or absence) of these specific impurities or components at levels outside of the acceptable range, may cause reduced process performance or increased maintenance issues. For example, in some processes, high enough levels of calcium and magnesium salts in the process solution can cause scaling of boilers and heat exchangers. In another example, the presence of iron and manganese ions at certain levels can interfere with processes like, dyeing, tanning, papermaking. Off-spec water may also include saline water sources, such as sea water and brackish water. Methods of measuring of impurities in water include monitoring turbidity, hardness, alkalinity, free mineral acid, pH, dissolved and suspended solids. For example, in cooling water systems, levels of biomass, chlorides, metals and other minerals are maintained in their acceptable ranges through use of blowdown streams and chemical additions. Off-spec water may include water from sources whose specifications do not meet the requirements for potable water use. Uses of potable water include for example human and/or animal consumption, agricultural use, e.g., irrigation, and the like. Off-spec water may also include water from sources whose specifications do not meet the requirements for direct use in a process to which the hydration unit is fluidly coupled.

In some processes, the direct introduction of non-potable, and in particular off-spec water, e.g., sea, saline or brackish water, will introduce non-process elements, or NPEs, which are components that are not needed nor normally found within the process. These NPEs may be in the form of salts, organics, metals, and solids in both dissolved and suspended forms, and may be non-volatile, which will require a continuous disposal of process liquid to prevent build up. Disposing of process liquid will of course also dispose of valuable process chemicals, which are necessary for the performance of the process.

In some embodiments, the NPEs introduced with the non-process, or off-spec makeup water will not only become part of the process solution but will cause undesirable side reactions in the process. Examples of undesirable side effects include precipitation of salts, for example $Mg(OH)_2$ in the cases where at least a portion of the water makeup is sourced from sea water. Salt formation can cause fouling and scaling of equipment and surfaces, in addition to being a potential unintended reactant in the system chemistry.

On the other hand, water that is fit for applications such as agriculture, municipal water systems and human consumption, with little or no further treatment, is considered to be fresh or potable water.

Gas-liquid contact systems produce humidified gas streams which can be used as feedstock for other processes, such as cooling tower processes, biomass or cell culture bioreactor processes, and carbon dioxide capture processes. Alternate water sources may include water sources that would otherwise be unfit for use in a process. Such as, non-potable water, off-spec water, sea water, saline water, brackish water, non-process water, and the like.

$CO_2$ Capture Technology

The current operating method of processes that utilize liquid sorbent technology to capture $CO_2$ (from both point sources or dilute sources such as the atmosphere) require a large amount of fresh water input to the process to make-up for water loss due to evaporation. In many parts of the world, this can become a problem when looking at the required water permits for installing and operating $CO_2$ capture facilities and may limit the acceptable locations for deploying the technology. If a non-potable, and/or off-spec water source can be used as makeup instead of fresh or potable water, this restriction can be greatly reduced or eliminated.

Where a direct air capture (DAC) system is used, and that DAC system includes units such as a circulating fluidized bed calcination unit, fluidized bed pellet reactors, slaking systems and the like, there may be intermediate feedstocks involved, for example solid precipitate in the form of calcium carbonate, which are used to feed downstream systems. Here, the NPEs brought in with the makeup water could wind up in the solid precipitate and alter the composition and properties of the solids being formed and processed in downstream systems, including the fluidized bed pellet reactor and calcination systems. In some aspects, alterations in crystal structure of calcium carbonate pellets grown in pellet reactors could result in softer, more porous pellets, which could then be more difficult to process and transfer. Additional salts that make it into the feed to downstream systems such as the calcination system could produce unintended side effects, such as possible fouling of the calcination system due to the presence of low melting point eutectic salts.

In systems with gas-liquid contactors, the process may still require fresh water for other specific process purposes. For example, in some DAC processes, such as the pelletized calcium process, where air contactor, slaking, fluidized pellet reactors and circulating fluidized bed calciner system apparatus are used, there is sometimes a need to add water into the process, for example in the slaking system, and/or as part of the pellet conditioning/washing system where process solution is washed from the calcium carbonate pellets before they are dried and sent to the calcination system.

Gas-liquid contact refers to the contact of a gas stream with a liquid stream, to facilitate transfer of at least a portion of one or more of a mass component or heat component of one stream to the other.

While DAC technologies (from dilute $CO_2$ sources) and Carbon Capture and Sequestration technologies (CCS, from concentration and/or point source $CO_2$ sources) can be liquid sorbent based processes, they can also be based on solid sorbent technologies, for example they may be based on the application of solid-phase materials, such as, amine-based sorbents, salts that can react with $CO_2$, metal organic frameworks, zeolites for $CO_2$ capture. The sorbents can be used in a range of sizes and forms, such as, pellets, granules, powder or sheets, based on the type or design of the reactor or vessel selected to house the sorbent. Examples of types of reactors and/or vessels include fluidized beds, packed beds and enclosures designed to contain sheets or structured blocks of sorbent. In some cases, both the $CO_2$ capture and desorption steps are carried out in the same reactor or vessel. In other cases, the sorbent captures $CO_2$ in one vessel, and then the saturated or $CO_2$-rich sorbent is transferred into another reactor, where the $CO_2$ desorption or sorbent regeneration is carried out and the $CO_2$ is released. From here, the regenerated sorbent is transferred back to the $CO_2$ capture reactor, and the cycle is repeated. $CO_2$ desorption or sorbent regeneration can be carried out by heating the sorbent, purging the sorbent with a gas, such as steam, applying vacuum, or a combination thereof.

Amine-based solid sorbents may consist of one type or a mix of amines added to porous solid supports. These supports may include materials such as, silica, metal organic frameworks, activated carbon, ceramic material, zeolite and cellulose.

In some aspects, the presence of moisture in a $CO_2$ containing gas is beneficial, for example it enhances the $CO_2$ capture capacity of some solid-sorbents, such as in the case of amine-based sorbents, in some cases it may slow down the degradation of the sorbent, such as in the case of amine-based sorbents, and in some cases the presence of moisture may provide both of these advantages. In other cases, the moisture assists in the $CO_2$ capture mechanism, such as, when using salts like potassium carbonate, the salt reacts with water and $CO_2$ to form a bicarbonate, hence capturing the $CO_2$. In such scenarios, it could be advantageous to humidify the $CO_2$ containing gas stream upstream of the solid-sorbent containing reactor, especially in hot/dry climate zones. Directly flowing liquid water through the sorbent bed or vessel can cause leaching and/or rearrangement of sorbents like amines in the support. Additionally, the impurities present in the water may bind to the sorbent, hence interfering with the $CO_2$ capture mechanism. In academic studies pertaining to the impact of moisture on sorbents, bubblers and/or spargers in a water-filled beaker, tank or vessel are commonly used to humidify the gas stream before sending it to the sorbent reactor or vessel.

Some $CO_2$ capture systems are configured for capturing from more concentrated sources, including from point sources such as flue gas from post-combustion systems, power plants, cement plants, geological $CO_2$ sources or a combination thereof.

Existing point source $CO_2$ capture systems, for example those used in Carbon Capture and Sequestration (CCS) or Carbon Capture and Utilization (CCU) technologies may include process solutions that contain amines, and may include standard industrial gas-liquid contact absorption units, including spray towers, packed columns and the like. In some aspects, the $CO_2$ capture system may also include regeneration units such as steam stripping columns. In these systems, the $CO_2$-containing gas is fed through the absorption tower, where it comes into contact with the capture solution and can end up taking water (in the form of vapor) out of the absorption unit and eventually venting to atmosphere.

Bioreactor Technology

A bioreactor system is a system that supports a biologically active environment, such as, plant or algae cultivation for biofuel production, or cell culture (plant or animal) for pharmaceutical processes.

In some embodiments, the NPEs introduced through use of off-spec makeup water as makeup to processes including bioreactor systems could impact the growth and/or productivity of the plant or cell-based culture, or could cause fouling and/or corrosion of system apparatus, and would require additional chemical treatment and possibly solids separation/filtration to resolve.

The innovations described herein offer technical and commercial advantages above what the existing systems and methods provide in resolving the above-mentioned water loss and make-up challenges in processes involving gas-liquid contactors. They also offer advantages above what existing methods provide in resolving challenges in deploying processes with gas-liquid contactors in areas with water restrictions and/or hot, dry climates.

In some embodiments, the hydration unit includes apparatus that enables it to contain a hydration solution within the hydration unit, move that hydration solution in such a way as to bring it into contact with a feed gas stream, allow for water to evaporate from the hydration solution into the gas stream, and let the hydrated gas stream leave the hydration unit without losing significant solution from the hydration unit in the form of splashing or entrained liquid droplets.

In some cases, having a hydration system fluidly coupled to a DAC system, including the ones described earlier would mean that a broader selection of water sources, including alternate, e.g., non-process, off-spec and the like, could be employed to meet the water requirements for mitigating evaporation losses.

In some embodiments, the hydration system uses alternate water sources for the hydration solution, and the hydration unit is fluidly coupled to one or more downstream processes. In some aspects, a non-process water source is any type of water source other than those that can be directly used in the main gas-liquid contacting process downstream of the hydration system. This alternate and/or non-process water source may be unfit for direct use in the downstream process because of levels of certain impurities or components that might interfere with the downstream process. In some aspects, the alternate water sources include for example, non-potable, sea water, brackish or saline water, greywater, rain or storm water, waste water, non-process water or combinations thereof.

Instead of adding an alternate water source directly to the downstream process solution, adding it to the hydration unit allows for isolated use of water with components that may be undesirable to add directly to the downstream process solution, as they may impact the process performance—including for example $CO_2$ uptake rates in $CO_2$ capture technologies, fouling, and/or they may interfere with downstream chemistry, solids buildup, and the like. This method of isolated use (e.g., use of the hydration unit to contain any non-water components within the hydration unit while still allowing water vapor to flow with the gas stream from the hydration unit to downstream processes) prevents the alternate water source from contaminating the downstream process solution, and still enables the benefits of hydration.

Use of non-process and/or alternate water for hydration in a system that ensures the hydration solution is kept separate from downstream process solutions allows for utilization of previously disposed or unusable solutions without risk of contamination of the process solution. It also resolves some of the issues in current gas-liquid contact systems, such as $CO_2$ capture systems and bioreactor systems, where direct use of alternate water sources, or "non-process water" in the process itself, requires additional treatment units, including chemical treatment, and filtration units including but not limited to reverse osmosis membrane filtration, solid agglomeration and settling, and the like, to mitigate impact of the non-water components on the existing system—and in some cases and depending on the type of non-process and/or alternate water, even these additional steps are not enough to facilitate direct use of the non-process water.

In some embodiments, the hydration solution used in the hydration unit is selected and conditioned to enable water evaporation without substantial $CO_2$ capture. For example, the hydration solution may be kept at a lower pH, and/or addition or use of chemicals with high $CO_2$ solubility, absorption and/or uptake kinetics, is avoided such that $CO_2$ solubility, kinetics and absorption in the hydration solution is lower than that in the downstream process, so that the hydration solution does not compete with the downstream $CO_2$ capture process solution to capture $CO_2$. For instance, while salt water is capable of capturing $CO_2$ from air, it has significantly slower kinetics of $CO_2$ absorption, hence it won't interfere with a downstream $CO_2$ capture process and can be used in the hydration system.

Examples of some solutions which may be considered problematic as hydration solutions include, for example, strong alkaline solutions, such as, potassium hydroxide, sodium hydroxide, potassium carbonate and potassium bicarbonate; and inclusion of additional components, such as catalysts and enzymes, that are known to improve the $CO_2$ uptake kinetics of the $CO_2$ capture solution, or any other solutions or chemicals that are normally employed in $CO_2$ capture systems.

Conversely, $CO_2$ capture solutions used in processes such as DAC and CCS are solutions that are selected and used specifically for their better performance/ability in capturing at least a portion of $CO_2$ when contacted with a $CO_2$ containing gas. Examples include, alkaline solutions, such as, potassium hydroxide, sodium hydroxide, potassium carbonate and potassium bicarbonate; and the solution can include additional components, such as catalysts and enzymes, that are known to improve the $CO_2$ uptake of the $CO_2$ capture solution.

In some embodiments, with evaporation losses from the main process solution minimized, or altogether eliminated through fluidly coupling it with an upstream hydration unit, would then allow the main process to become a zero water loss process. This could be accomplished by utilizing an evaporator driven by heat, including but not limited to process waste heat from units within the process, to produce water vapor from the main process solution. The water vapor from the process solution could then be collected and condensed as clean water and used to provide all the water requirements throughout the main process (e.g., in the washing, lime hydration and/or slurry formation steps of the DAC system mentioned earlier).

In some embodiments, process solution refers to any solution used in the downstream, or "main", process, and does not include the hydration solution. For example, $CO_2$ capture solution in the DAC gas-liquid contactor system is a process solution.

In some embodiments, the gas stream flows through the hydration unit by use of downstream apparatus—e.g., fans, blowers and the like, located in downstream processes, such that the hydration unit itself does not require additional transport equipment to move the gas stream through the unit.

In some embodiments, the temperature of the hydration solution in the hydration system can be controlled using heat exchangers with heat input from waste heat or other heat sources. In some aspects, this can alter the water carrying capacity of the gas stream flowing through the hydration system, and as a result, would be a means of controlling water content in the downstream units, helping to minimize water evaporation from the downstream process units, and in some cases even adding water to the downstream process if necessary. In some cases, this method of hydration solution temperature control and heat exchange may also help to reduce the wetted volume of the contact zone, or the volume of gas-liquid contact packing that is present within the contact zone, that is normally required for the humidification process, which in turn would reduce the pressure drop across the gas flow path and would require less energy to move the gas through the hydration system.

In some cases, including for example in the solid sorbent technology for $CO_2$ capture, the co-adsorption of $H_2O$ with $CO_2$ on the sorbent can increase the energy demand during the desorption stage. In such situations, the above discussed method of hydration solution temperature control may help to optimize the advantages of the presence of moisture in the gas stream in the $CO_2$ capture stage, against the energy penalty in the desorption stage due to the adsorption of $H_2O$ on the sorbent.

In some embodiments, the contact zone is a portion of the hydration system that facilitates gas-liquid contact, and may include at least one or more of a packing material (either loose or structured), splash bars, trays, spray nozzles, or other means of dispersing the liquid through the gas such that the liquid surface area is maximized within the volume of the contact zone. Depending on the type of material used in the contact zone and/or the design of the contact zone, the contact zone would have a certain surface area to volume ratio, where the surface area is the total available area of the contact zone that could enable the gas-liquid contact. In some aspects, the surface area to volume ratio can vary between 0 to 2000 $m^2/m^3$.

In some embodiments, gas-liquid contact packing is a material that fills at least a portion of the volume in a gas-liquid contactor system, and facilitates contact between a gas stream and the process solution used in the gas-liquid contactor system. Some examples of gas-liquid contact packing as applied in downstream processes are described in FIGS. 2 and 4.

In some embodiments, the amount of wetted surface area within the contact zone in the hydration system facilitates contact between a gas stream and the hydration solution, and may drive the humidification amount or level of water saturation in the gas stream. As a result, the amount of wetted surface area within the contact zone can be adjusted and used to control the gas stream humidity. In some aspects, hydration packing, also referred to as packing in some embodiments, is a material that fills at least a portion of space in the contact zone within the hydration system, and facilitates contact between a gas stream and the hydration solution, similar to other types of gas-liquid contact packing material. In some aspects, this packing may include one or more of loose or random fill or structured fill. The structured fill can consist of material that is modular in form, such that it enables stacking in an ordered array, while loose fill may not have a fixed shape but is instead a type of randomly arranged packing material.

Wetted contact zone, which may include packing in some embodiments, is the portion of contact zone that has solution distributed on the surface, such that the solution is spread evenly, rather than beaded, in order to increase or maximize the interface between the gas and the liquid streams. This interface is usually measured in terms of the wetted surface area to volume ratio of the contact zone. In some aspects, the wetted contact zone has a higher pressure drop than a dry contact zone of the same material.

In some aspects, the system may be configured to spray hydration solution over only a portion of the contact zone, wetting that portion and leaving another portion of the contact zone dry. In some embodiments, this contact zone may include packing. This method of partial wetting of the packing would serve to reduce the overall pressure drop through the packing (wet packing has a higher pressure drop than dry packing) while still providing humidification to the gas stream. In some aspects, having control and/or flexibility over how much of the existing hydration packing is wetted would be useful in dealing with changes in weather—e.g., only wet a portion of the back end of the packing on days/times when minimal humidification is needed, versus wetting all of the packing on days/times when maximum humidification is needed. In some aspects, this would require designing the gas-liquid contact packing to handle the "driest/most restrictive" climate case, but would also make it capable of reducing the volume of packing wetted in order to save pumping and fan energy whenever possible. In some aspects, this could be very useful in a location with a wide range of seasonal conditions.

As another example, the hydration system may be configured to promote solids settling in specific locations of the hydration solution collection basin. In some aspects, if the hydration solution contains particulates or fines, and it flows over the hydration packing, the contactor itself will work to disperse the fines over the entire area of the solution collection basin, which is a basin or a tank used to collect the hydration solution or $CO_2$ capture solution after it has been used to wet the packing in a hydration system or a gas-liquid contactor system, respectively. As the drops of solution fall out of the bottom of the packing, the solids they contain may settle onto the solution collection basin floor when the liquid flow is not sufficient to carry the fines along the basin to the liquid discharge sump. Thus, the basin acts similar to a settling tank. The basin may have a large inclined section, located above liquid level, which facilitates build-up of the solid layer. As drops fall and hit this inclined section, they cause a "splash." On a perfectly horizontal surface this splash would cause the solids to jostle from one place to another with no net movement in one single direction over long periods of time. But with an inclined section as described in example embodiments in the present disclosure, the force of the droplet hitting the inclined surface washes the solids down the incline. This is due in part to the force of the droplet hitting the surface, as well as the force of gravity pulling more solids in the downward direction. Thus, even with very small inclines, the solids will move toward the lower end of the surface and eventually discharge into a sump area where they may be removed, for example, with an auger, and the clarified liquid may also be withdrawn from the contactor basin.

In another example, drift elimination section installation and housing in the hydration system may be improved in some applications by installing and sealing the drift elimination material around the area immediately upstream of the exit. This method of installing and housing drift elimination material enables the drift elimination material to be supported and sealed such that any gas moving through the hydration packing material cannot leave the system without first moving through the drift elimination material. In these types of hydration systems, and where downstream processes move the gas with induced fans, the pressure gradient between the hydration system and the downstream environment is such that gas will always leak into the hydration system rather than out of the system, which also aids in preventing escape of liquid aerosols from the system.

In another example, the drift elimination material is positioned between the packing material and gas outlet of the hydration system, where the drift elimination material may be physically attached to the packing material and sealant is then additionally applied around the perimeter of the drift elimination material, sealing the outer edges of the material to the outer housing of the hydration system. Sealing the drift elimination material to the housing walls in this way provides a desirable seal against any gaps, for example between the packing material and the housing, where gas and/or hydration solution may be able to move, that could allow for gas entrained with hydration solution to bypass the drift elimination material.

These modifications to the drift elimination section installment and housing/sealing may provide technical and commercial improvements to the hydration system method/device, because the system includes non-water chemicals and/or impurities that must be contained within the hydration system and not contaminate downstream processes.

The process streams in the hydration systems, as well as process streams within any downstream processes with which the hydration systems are fluidly coupled, can be flowed using one or more flow control systems implemented throughout the system. A flow control system can include one or more solids conveyors, flow pumps, fans or blowers to move the process streams, one or more flow pipes through which the process streams are flowed and one or more valves to regulate the flow of streams through the pipes.

The term "couple" and variants of it such as "coupled", "couples", and "coupling" as used in this description is intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections. In particular, a fluid coupling means that a direct or indirect pathway is provided for a fluid to flow between two fluidly coupled devices.

In some embodiments, a flow control system can be operated manually. For example, an operator can set a flow rate for each pump or transfer device and set valve open or close positions to regulate the flow of the process streams through the pipes in the flow control system. Once the operator has set the flow rates and the valve open or close positions for all flow control systems distributed across the system, the flow control system can flow the streams under constant flow conditions, for example, constant volumetric rate or other flow conditions. To change the flow conditions, the operator can manually operate the flow control system, for example, by changing the pump flow rate or the valve open or close position.

In some embodiments, a flow control system can be operated automatically. For example, the flow control system can be connected to a computer or control system (e.g., control system 999) to operate the flow control system. The control system can include a computer-readable medium storing instructions (such as flow control instructions and other instructions) executable by one or more processors to perform operations (such as flow control operations). An operator can set the flow rates and the valve open or close positions for all flow control systems distributed across the facility using the control system. In such embodiments, the operator can manually change the flow conditions by providing inputs through the control system. Also, in such embodiments, the control system can automatically (that is, without manual intervention) control one or more of the flow control systems, for example, using feedback systems connected to the control system. For example, a sensor (such as a pressure sensor, temperature sensor or other sensor) can be connected to a pipe through which a process stream flows. The sensor can monitor and provide a flow condition (such as a pressure, temperature, or other flow condition) of the process stream to the control system. In response to the flow condition exceeding a threshold (such as a threshold pressure value, a threshold temperature value, or other threshold value), the control system can automatically perform operations. For example, if the pressure or temperature in the pipe exceeds the threshold pressure value or the threshold temperature value, respectively, the control system can provide a signal to the pump to decrease a flow rate, a signal to open a valve to relieve the pressure, a signal to shut down process stream flow, or other signals.

Referring to FIG. 1, a hydration system 100 for the humidification of a gas stream 109 includes a gas inlet section 102, contact zone 104, drift elimination section 106, hydration solution distribution unit 103, a hydration housing vessel 101, a hydration solution collection basin 105, a pump 113, and a fan 107. In some cases, the pump 113 may be located in a pump house or pit that is external to the hydration housing vessel 101. In some cases, the hydration solution 108 used in the system 100 can include portions of one or more of types of water, such as, non-potable water, sea water, saline water, brackish water, rain or storm water, gray water or waste water. In some aspects system 100 may include a control system 999 communicably coupled to the components (illustrated or otherwise).

In some aspects, the gas stream 109 is ambient air that moves through the system 100 using an induced draft fan 107. In some cases, the induced draft may be generated by other mechanical means, for example by a blower. In some cases, the fan 107 may not be directly interfaced with the hydration system 100 and may be a component of a downstream process, such that at least a portion of the gas stream 110 exiting the hydration system 100 is fed into the downstream process. In some aspects, the fan 107 may be a forced draft fan instead of an induced fan, and as such placed upstream of the hydration system 100, such that at least a portion of the gas stream 109 is forced through the components of the hydration system 100. In some cases, the gas stream 110 exiting the system 100 may carry a portion of the hydration solution 108 as drift. In the case of an induced draft fan 107, the drift (containing aerosol droplets of hydration solution, which may include salts or other impurities, depending on the hydration solution source) may cause fouling, corrosion or other forms of deterioration of the fan components or housing. In such cases, it may be advantageous to have a forced draft fan over an induced draft fan, to reduce the maintenance cost of the fan 107.

In some aspects, the hydration housing vessel 101 comprises a gas inlet section 102, contact zone 104 and a drift elimination section 106. In some aspects, the contact zone 104 comprises of at least one or more of a packing, splash bars, trays, or spray nozzles.

In some aspects, the function of the system 100 is to pre-condition the gas stream 109 before it is sent to a downstream process. The stream 109 is humidified upon contacting the hydration solution stream 108 in the system 100. In some aspects, this pre-conditioning helps to reduce evaporative losses from a liquid solution used in the downstream process when it comes in contact with the gas stream 110. In some aspects, having the hydration system 100 upstream of the process provides a gas stream 110 to the downstream process such that water loss through evaporation is minimized from the process solution of the downstream process. In some aspects, this could reduce the amount of fresh solution make-up required in the downstream process. This fresh solution make-up may have restrictions on the types of non-water content, including for example the types of ionic species, dissolved and suspended solids, metallic, mineral and organic matter, and the like. These non-water components may have undesirable effects on performance of the downstream process, and as such need to be restricted from entry into the downstream process. Directly adding non-process liquid into the downstream process, from sources such as those listed as acceptable for system 100, may not be desirable or possible. Additionally, in some aspects where the downstream process is operating in hot, dry climates, and/or where it might be desirable to conserve potable or clean water, using system 100 with alternate water sources, such as those used for hydration solution stream 108, as a means of preventing process solution evaporation from the downstream process allows for the use of alternate water sources without incurring the problems associated with using these sources directly in the downstream process.

The gas stream 109 is passed through the gas inlet section 102, and into the contact zone 104. In some aspects, the gas inlet section 102 is an inlet louver that is used to keep the hydration solution that is moving from the distribution unit 103 through the contact zone 104 and into the collection basin 105, from splashing out of the hydration system 100. After passing through the gas inlet section 102, the gas enters the contact zone 104, which is wetted with hydration solution 108 flowing down from the hydration solution distribution unit 103, through the contact zone 104 and discharging into the hydration solution collection basin 105. In the contact zone 104, the gas stream 109 is contacted with the hydration solution 108, and exits the contact zone 104 as a gas stream 110, which is partially or fully saturated with at least a portion of evaporated hydration solution 108. In some cases, the extent of saturation of gas stream 109 can be a function of the ambient temperature, the temperature of hydration solution stream 108, surface area of the contact zone 104, and other thermodynamic factors. The partially or fully saturated gas stream 110 exits the system 100 through the drift elimination section 106, which prevents any non-evaporated hydration solution (e.g., hydration solution droplets) from being carried out of hydration system 100 by the gas stream 110. In some aspects, the drift elimination section 106 is a drift eliminator that prevents hydration solution droplets from leaving the hydration system 100 and entering any downstream processes.

Hydration solution stream 108 flowing down the contact zone 104, as well as any hydration solution that has been collected by the gas inlet section 102, the drift elimination section 106 or a combination thereof, is discharged into the hydration solution collection basin 105. In some cases, over time, the hydration solution in the hydration system 100, may become concentrated, as a result of the continual evaporation of pure water. In some cases, as a result of the evaporation process, the hydration solution may become concentrated with non-volatile components, including for example, metals, minerals, ions, suspended solids, organics, dissolved solids and the like. This concentrated hydration solution and the concentrated non-volatiles may be periodically or continually removed from the basin 105 as a slip stream 112, before the pump 113 recycles the hydration solution 108 back to the hydration solution distribution unit 103. The collection basin 105 may also be periodically or continually supplied with a makeup hydration solution stream 111. In some cases, the source of the makeup hydration solution stream 111 may include at least a portion of fresh water, non-potable water, waste water, gray water, rain or storm water, brackish water, saline water, sea water or the like. In some cases, the distribution unit 103, may include at least a portion of a pressurized header system with nozzles to spray the hydration solution 108 onto the contact zone 104, a non-pressurized or atmospheric basin that feeds nozzles which operate using hydrostatic pressure or head, or a combination thereof.

In some cases, the system 100 may be fluidly coupled to one or more downstream processes, including but not limited to $CO_2$ capture units, including $CO_2$ capture units that use sorbent technology, liquid capture technology or a combination thereof, $CO_2$ capture units for both dilute and point source (concentrated) applications, bioreactors, or a combination thereof.

Figure 2:
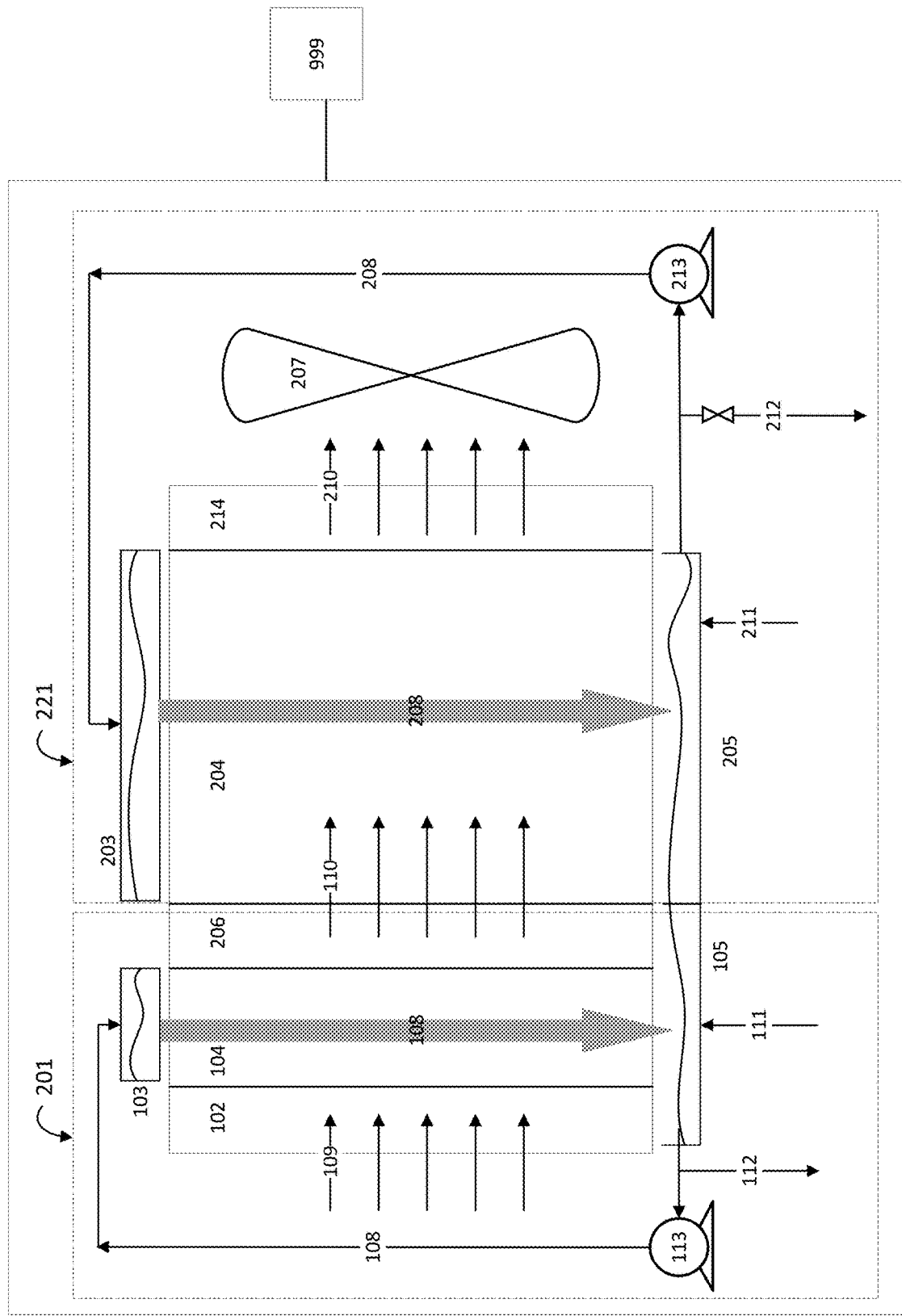
FIG. 2 illustrates an example system and process for humidification of gases in association with a direct air capture system.

Referring to FIG. 2, a $CO_2$ capture system 200 includes a hydration sub-system 201 coupled with a gas-liquid contactor sub-system 221, where the sub-system 221 is configured/purposed for $CO_2$ capture. The hydration sub-system 201 includes a gas inlet section 102, contact zone 104, drift elimination section 206, hydration solution distribution unit 103, a hydration solution collection basin 105 and a pump 113. The gas-liquid contactor sub-system 221 includes $CO_2$ capture packing 204, drift elimination section 214, $CO_2$ capture solution distribution unit 203, a pump 213, a $CO_2$ capture solution collection basin 205 and an induced draft fan 207. In some aspects system 200 may include a control system 999 communicably coupled to the components (illustrated or otherwise).

In some cases, the sub-system 221 includes apparatus and process solutions similar to direct air capture systems in existence to date. The $CO_2$ capture solution 208 used in the sub-system 221 is specifically selected for its ability to capture $CO_2$ from gas stream 109. Additionally, the amount and material of construction of contact zone 104 used in the sub-system 201 may be different than the $CO_2$ capture packing 204, based on the distinctive characteristics and functions required in each of these systems. The main function of the hydration solution stream 108 used in the sub-system 201 is to humidify the gas stream 109 through evaporation of water from the hydration solution, and this hydration solution can be comprised of a variety of sources such as, non-potable water, sea water, saline water, brackish water, rain or storm water, gray water, waste water from either the downstream process or elsewhere, or a combination thereof. In some aspects, the $CO_2$ capture solution stream 208 used in the sub-system 221 can be any liquid that can remove at least some $CO_2$ from the gas stream 110, and can include alkaline solutions, such as, potassium hydroxide, sodium hydroxide, potassium carbonate and potassium bicarbonate; and can include additional components, such as catalysts and enzymes, to improve the $CO_2$ uptake of the liquid solution.

The function of the sub-system 201 is to pre-condition the gas stream 109 before it is sent to the sub-system 221. In some aspects, the gas stream 109 is ambient air that moves through system 200, and in some cases at least a portion of this movement may be generated using an induced draft fan 207, which is a component of the downstream gas-liquid contactor sub-system 221. In some aspects, the fan 207 is a forced draft fan instead of an induced fan, and as such is placed upstream of the hydration sub-system 201, such that at least a portion of the gas stream 109 is forced through the components of the system 200. In some cases, the gas stream 210 exiting the system 200 may carry a portion of the hydration solution 108, the $CO_2$ capture solution 208, or a combination of both as drift. In the case of an induced draft fan 207, the drift (containing aerosol droplets of one or more of the hydration solution and the $CO_2$ capture solution, which may include salts, hydroxide or other impurities, depending on the hydration solution source and the $CO_2$ capture solution source) may cause fouling, corrosion or other form of deterioration of the fan components or housing. In such cases, it may be advantageous to have forced draft fan over an induced draft fan, to reduce the maintenance cost of the fan 207.

The gas stream 109 is humidified upon contacting the hydration solution stream 108 in the sub-system 201. In some aspects, this pre-conditioning helps to reduce evaporative losses from the $CO_2$ capture solution stream 208 when it comes in contact with the gas stream 110. In some aspects, having the hydration sub-system 201 upstream of the gas-liquid contactor sub-system 221 provides a gas stream 110 to the sub-system 221 such that water loss through evaporation is minimized from the $CO_2$ capture solution 208 of the sub-system 221. In some aspects, this could reduce the amount of fresh $CO_2$ capture solution make-up stream 211 required in the gas-liquid contactor sub-system 221. This $CO_2$ capture solution makeup stream 211 may have restrictions on the types of non-water content, including for example the types of ionic species, dissolved and suspended solids, metallic, mineral and organic matter, and the like. These non-water components may have undesirable effects on process performance of sub-system 221, and as such need to be restricted from entry into sub-system 221. Directly adding non-process liquid into sub-system 221, from sources such as those listed as acceptable for sub-system 201, may not be desirable or possible. Additionally, in some aspects where sub-system 221 is operating in hot, dry climates, and/or where it might be desirable to conserve potable or clean water, using sub-system 201 with alternate water sources, such as those used for the hydration solution stream 108, as a means of preventing process solution, e.g., $CO_2$ capture solution evaporation from sub-system 221 allows for the use of alternate water sources without incurring the problems associated with using these sources directly in sub-system 221.

The gas stream 109 is passed through a gas inlet section 102, and into the contact zone 104. In some aspects, the contact zone 104 comprises of at least one or more of a packing, splash bars, trays, or spray nozzles. In some aspects, the gas inlet section 102 is an inlet louver that is used to keep the hydration solution 108 that is moving from the distribution unit 103 through the contact zone 104 and into the collection basin 105, from splashing out of the hydration sub-system 201. After passing through the gas inlet section 102, the gas enters the contact zone 104, which is wetted with the hydration solution 108 flowing down from the hydration solution distribution unit 103, through the contact zone 104 and discharging into the hydration solution collection basin 105. In the contact zone 104, the gas stream 109 is contacted with the hydration solution 108 and exits the contact zone 104 as a gas stream 110, which is partially or fully saturated with at least a portion of evaporated hydration solution 108. In some cases, the extent of saturation of gas stream 109 can be a function of the ambient temperature, the temperature of hydration solution stream 108, surface area of the contact zone 104, and other thermodynamic factors. The partially or fully saturated gas stream 110 exits the sub-system 201 through the drift elimination section 206, which prevents any non-evaporated hydration solution (e.g., hydration solution droplets) from being carried out of hydration sub-system 201 by the gas stream 110. In some aspects, the drift elimination section 206 prevents hydration solution droplets from leaving the hydration sub-system 201 and entering the downstream sub-system 221. In some implementations, section 206 may contain drift eliminator apparatus, inlet louver apparatus like that described in section 102, or a combination thereof, such that it can function to contain the hydration solution 108 within the contact zone 104 and $CO_2$ capture solution 208 within the $CO_2$ capture packing 204 to minimize or eliminate cross-contamination of both the solutions. In some cases, the section 206 may be designed to reduce the pressure drop across it, by optimizing the portion allocated to drift eliminator function versus inlet louver function. In some instances, parts of the drift elimination section 206 may be a component of the contact zone 104 or the packing 204. In some instances, the packing 204 may include inlet louver apparatus and the section 206 may include a drift elimination apparatus. In some instances, the contact zone 104 may include a drift eliminator apparatus and the section 206 may include an inlet louver apparatus. In some instances, contact zone 104 and the packing 204 may include a drift eliminator apparatus and an inlet louver apparatus, respectively, and section 206 is optionally included in the system 200.

Hydration solution stream 108 flowing down the contact zone 104, as well as any non-evaporated hydration solution that has been collected by the gas inlet section 102, the drift elimination section 206 or a combination thereof, is discharged into the hydration solution collection basin 105. In some cases over time, the hydration solution in the hydration sub-system 201, may become concentrated, as a result of the continual evaporation of pure water. In some cases, as a result of the evaporation process, the hydration solution may become concentrated with non-volatile components, including for example, metals, minerals, ions, suspended solids, organics, dissolved solids and the like. This concentrated solution and the concentrated non-volatiles may be periodically or continually removed from the basin as a slip stream 112, before the pump 113 recycles the hydration solution 108 back to the hydration solution distribution unit 103. The collection basin 105 may also be periodically or continually supplied with a makeup hydration solution stream 111. In some cases, the source of the makeup hydration solution stream 111 may include at least a portion of fresh water, non-potable water, waste water, gray water, rain or storm water, brackish water, saline water, sea water or the like. In some cases, the hydration solution distribution unit 103, may include at least a portion of a pressurized header system with nozzles to spray the hydration solution 108 onto the contact zone 104, a non-pressurized or atmospheric basin that feeds nozzles which operate using hydrostatic pressure or head, or a combination thereof.

After the non-evaporated hydration solution (e.g., hydration solution droplets) are removed by the drift elimination section 206, the gas stream 110 enters the $CO_2$ capture packing 204 where the gas stream 110 comes in contact with the $CO_2$ capture solution 208 which flows down from the distribution unit 203 through the $CO_2$ capture packing 204. At least a portion of the $CO_2$ present in the gas stream 110 reacts with the $CO_2$ capture solution 208 in the $CO_2$ capture packing. $CO_2$ capture solution 208 along with the captured $CO_2$ flows through the $CO_2$ capture packing 204 and is collected in the collection basin 205. From the basin, the $CO_2$ capture solution is either recycled in stream 208 to the $CO_2$ capture solution distribution unit 203 using pump 213 and flushed back over the $CO_2$ capture packing 204 or is sent as stream 212 for downstream processing, such as, for the recovery of captured $CO_2$. Finally, after having been humidified with water and then having the $CO_2$ removed the gas passes as stream 210 through the second drift elimination section 214 to prevent the escape of $CO_2$ capture solution 208 droplets. In some embodiments, the section 214 may contain drift eliminator apparatus, such that it can function to contain droplets of the $CO_2$ capture solution 208 from being carried away with the gas stream 210 into a downstream process or the atmosphere.

In some cases, the $CO_2$ capture system 200 may include multiple hydration sub-systems 201 coupled with multiple gas-liquid contactor sub-systems 221. In some aspects, some of the hydration sub-systems are turned on, while the other hydration sub-systems are turned off. In some cases, this may be based on feedback from measurement and control systems, such as the ones described in FIG. 8 and FIG. 11. In some aspects this may be done to optimize the overall process solution concentration in the $CO_2$ capture system 200. In some cases, the overall process solution concentration of stream 212 from the multiple gas-liquid contactor sub-systems 221 may be controlled by a variety of methods. For example, where the $CO_2$ capture solution stream 208 of each sub-system 221 is collected and mixed together, either in a universal capture basin 205, or as a result of mixing all process streams 212 in downstream processes, one method to control process solution concentration in the combined streams 212 could be to use flow control on pump 113 (e.g. by including a VFD or combining each pump 113 with a control valve, not shown) within each hydration sub-system 201. In such case, all the hydration sub-systems would respond in a similar way to a control signal, and there would arguably be a faster response and/or higher level of control, but at a higher equipment cost and control complexity. In some cases, the gas-liquid contactor sub-system 221 has a relatively slow response to changes in the water balance around the system, and as a result, may be effectively controlled in a less complex manner than described above. For example, another less discrete method to control the overall process solution concentration would be to turn on and off individual hydration sub-systems 201 (i.e., turn off individual pumps 113). This would result in higher evaporation taking place in the gas-liquid contactor sub-systems 221 downstream of the turned off sub-systems 201, and lower evaporation taking place in the gas-liquid contactor sub-systems 221 downstream of the turned on hydration sub-systems 201. This control method would still have a discrete level of control on the average overall process solution concentration, as seen by processes downstream of sub-system 221. This method of control may have lower equipment costs and simpler control methods, and may still provide an average evaporation rate (or, more specifically, humidification rate) that can still be effectively controlled to match the average water intake.

Figure 3:
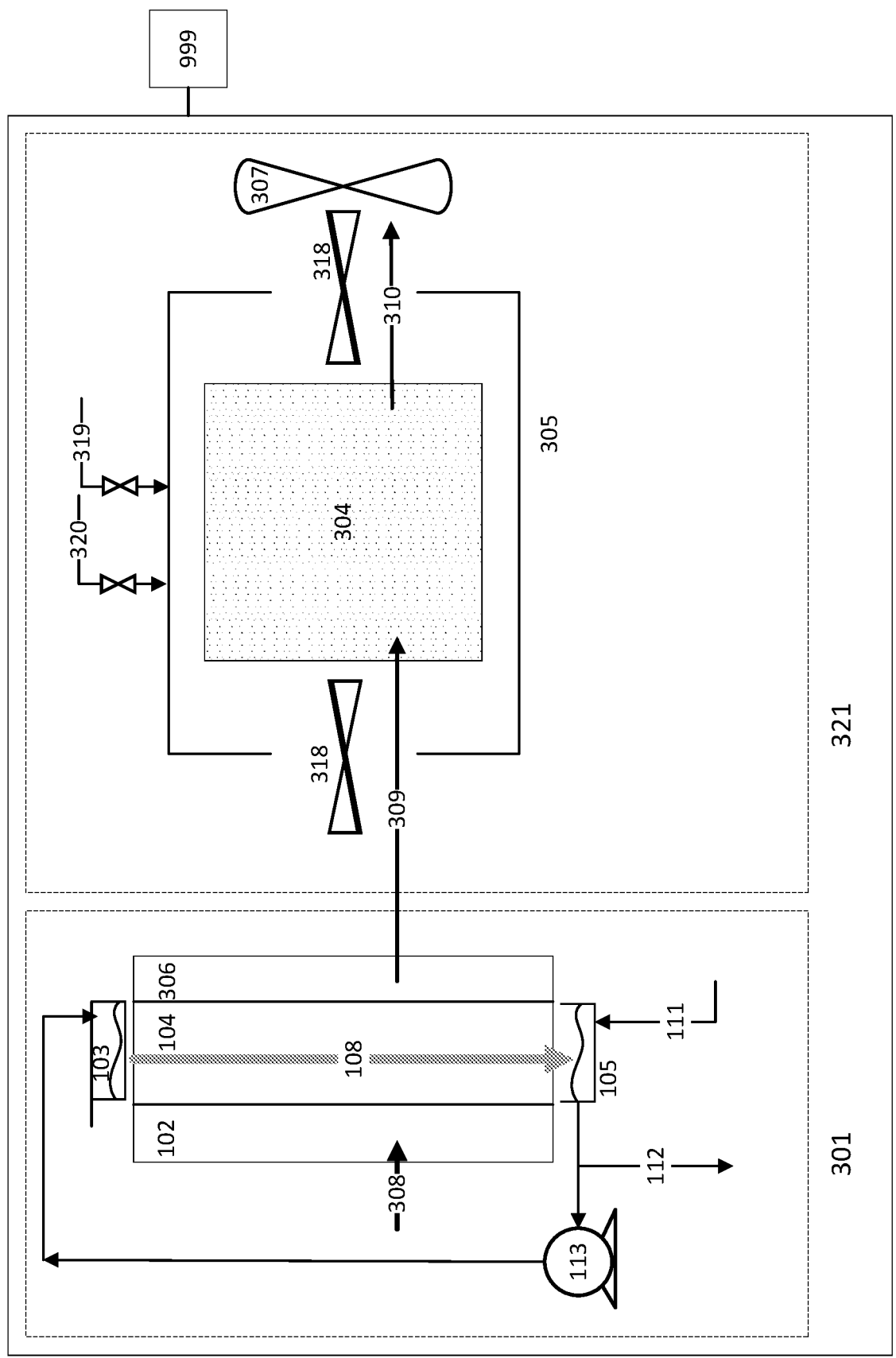
FIG. 3 illustrates an example system and process for humidification of gases in association with a solid sorbent-based $CO_2$ capture technology.

Referring to FIG. 3, a $CO_2$ capture system 300 includes a hydration sub-system 301 fluidly coupled with a $CO_2$ capture sub-system 321. Sub-system 301 includes a gas inlet section 102, contact zone 104, drift elimination section 306, hydration solution distribution unit 103, pump 113 and a hydration solution collection basin 105. The $CO_2$ capture sub-system 321 includes a housing vessel 305 which contains sorbent 304, fan 307 and optional vessel sealants 318. In some aspects, the sealants 318 may include various types of valves, doors, lids or other mechanisms that allow for the housing vessel 305 to become periodically isolated from the upstream and downstream systems. In some aspects system 300 may include a control system 999 communicably coupled to the components (illustrated or otherwise).

The gas stream 308 is a $CO_2$ containing gas stream, such as, ambient air, flue gas, exhaust gas, or industrial waste gas. In some cases, the hydration solution stream 108 used in the hydration sub-system 301 can include portions of one or more of types of water, such as, non-potable water, sea water, saline water, brackish water, rain or storm water, gray water or waste water.

In some embodiments, the sorbent 304 includes a solid phase material that can capture at least a portion of $CO_2$ from the gas stream 309. Examples of such materials include, amine-based sorbents, metal organic frameworks, zeolites and alkali carbonates. In some aspects, the presence of moisture in the gas 309 can enhance the $CO_2$ capture capacity of the sorbent 304, inhibit or slow down the degradation mechanism of the sorbent 304, or a combination of both. In some aspects, the $CO_2$ capture can be carried out at ambient temperature and pressure, or, at a temperature and/or pressure higher than the ambient conditions.

The function of the sub-system 301 is to pre-condition the gas stream 308 before it is sent to the sub-system 321. In some aspects, at least a portion of the movement of gas stream 308 through the sub-system 301 may be generated using an induced draft fan 307, which is a component of the downstream $CO_2$ capture sub-system 321. In some aspects, the fan 307 may be a forced draft fan instead of an induced fan, and as such is placed upstream of the hydration sub-system 301, such that at least a portion of the gas stream 308 is forced through the components of the system 300. The stream 308 is humidified upon contacting the hydration solution stream 108 in the sub-system 301. In some cases, the gas stream 310 exiting the system 300 may carry a portion of the hydration solution 108 as drift. In the case of an induced draft fan 307, the drift (containing aerosol droplets of hydration solution, which may include salts, or other impurities, depending on the hydration solution source) may cause fouling, corrosion or other form of deterioration of the fan componentry or housing. In such cases, it may be advantageous to have forced draft fan over an induced draft fan, to reduce the maintenance cost of the fan 307.

The gas stream 308 is passed through the gas inlet section 102, and into the contact zone 104. In some aspects, the contact zone 104 comprises of at least one or more of a packing, splash bars, trays, or spray nozzles. In some aspects, the gas inlet section 102 is an inlet louver which keeps the hydration solution from splashing out of the hydration sub-system 301. After passing through the gas inlet section 102, the gas stream enters the contact zone 104, which is wetted with the hydration solution stream 108 flowing down from the hydration solution distribution unit 103, through the contact zone 104 and discharging into the hydration solution collection basin 105. In the contact zone 104, the gas stream 308 is contacted with the hydration solution stream 108, and exits the packing as a gas stream 309, which is at least partially humidified with water vapor evaporated from the hydration solution stream 108. The extent of saturation or humidification of gas stream 308 will be a function of its temperature, the temperature of hydration solution stream 108, surface area of the contact zone 104, and other thermodynamic factors. The humidified gas stream 309 exits the sub-system 301 through the drift elimination section 306, which prevents any non-evaporated hydration solution (e.g., solution droplets) from being carried away by the gas stream 309 into the sub-system 321.

In some embodiments, drift elimination section 306 may contain drift eliminator apparatus, inlet louver apparatus like that described in unit 102, or a combination thereof, such that it can function to contain the hydration solution 108 within the hydration sub-system 301; minimizing or eliminating cross-contamination between the components within sub-systems 301 and 321. In some cases, the section 306 may be designed to reduce the pressure drop across it, by optimizing the portion allocated to drift eliminator function versus inlet louver function.

Hydration solution stream 108 flowing down the contact zone 104 and that collected by the unit gas inlet section 102, drift elimination section 306, or a combination of both, is collected and also discharged into the hydration solution collection basin 105. In some cases over time, the hydration solution 108 in the hydration system 301, may become concentrated, as a result of the continual evaporation of pure water. In some cases, as a result of the evaporation process, the hydration solution may become concentrated with non-volatile components, including for example, metals, minerals, ions, suspended solids, organics, dissolved solids and the like. This concentrated solution and the concentrated non-volatiles may be periodically or continually removed from the hydration solution basin 105 as a slip stream 112, before the pump 113 recycles the hydration solution stream back to the hydration solution distribution unit 103. The collection basin 105 may also be periodically or continually supplied with a makeup hydration solution stream 111. In some cases, the source of the makeup hydration solution stream 111 may include at least a portion of fresh water, non-potable water, waste water, gray water, rain or storm water, brackish water, saline water, sea water or the like. In some cases, the distribution unit 103, may include at least a portion of a pressurized header system with nozzles to spray the hydration solution 108 onto the contact zone 104, a non-pressurized or atmospheric basin that feeds nozzles which operate using hydrostatic pressure or head, or a combination thereof.

After the hydration solution droplets are removed by the drift elimination section 306, the humidified gas stream 309 enters the $CO_2$ capture sub-system 321, where it comes in contact with the sorbent 304. At least a portion of the $CO_2$ from the gas stream 309 is captured onto the sorbent 304. In some aspects, a portion of the moisture present in the gas stream 309 can also be captured by the sorbent 304. Upon removal of at least a portion of the $CO_2$ present, moisture or a combination of both, the gas exits the sub-system 321 as gas stream 310.

In some aspects, when the $CO_2$ capture sub-system 321 is also used as a $CO_2$ desorption system, the system may consist of sealants 318. Following the capture of $CO_2$ from the gas stream 309, the next step may consist of desorbing the $CO_2$ for application in a downstream process and repeating the $CO_2$ capture-desorption cycle. The desorption can be carried out by sealing the sorbent 304 off from upstream and downstream units by closing the sealants 318, and then taking one or more of the following steps: heating the sorbent 304 with a heat stream 320, purging the sorbent 304 with a gas stream 319, such as steam, applying vacuum (not shown in the FIG. 3) on the sorbent 304, or a combination thereof. The sealants 318 can be used to isolate the sub-system 321 from the hydration sub-system 301 and the ambient conditions, when the desorption is performed. In some aspects, when the desorption is carried out in a different system than the $CO_2$ capture sub-system 321, the sealants 318 may not be required. In such cases, the sorbent 304 may be designed to be transferrable (e.g., small pellets of sorbent rather than sheets or blocks) and instead be transferred to another system (not shown in the FIG. 3) to carry out the desorption cycle.

Figure 4:
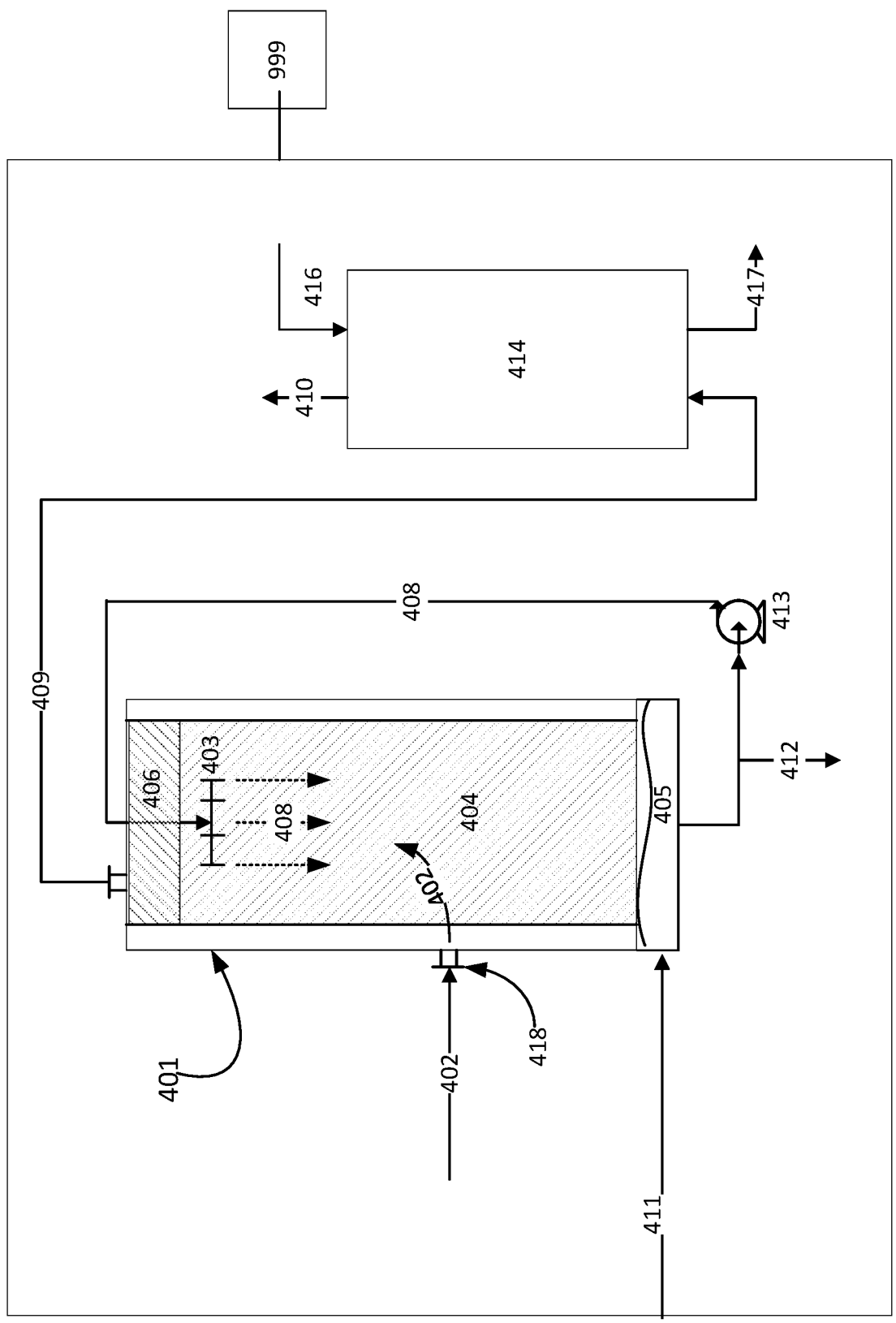
FIG. 4 illustrates an example system and process for humidification of gases in association with a liquid absorption based $CO_2$ capture technology.

Referring to FIG. 4, a $CO_2$ capture system 400 includes a hydration sub-system 401 fluidly coupled with a gas-liquid contactor sub-system 414, where sub-system 414 is configured/purposed for $CO_2$ capture. The hydration sub-system 401 includes apparatus such as contact zone 404, drift eliminator or demister unit 406, hydration solution distribution unit 403, pump 413 and gas inlet port 418 and a hydration solution collection basin 405. The gas-liquid contactor sub-system 414 may include apparatus such as internal packing or spray tower internals. In some aspects system 400 may include a control system 999 communicably coupled to the components (illustrated or otherwise).

In some aspects, the gas stream 402 is a $CO_2$ containing gas stream, such as, post-combustion flue gas, exhaust gas, geologically sourced $CO_2$, or industrial waste gas.

One function of the hydration solution stream 408 used in the system 401 is to humidify the gas stream 402 through evaporation of water from the hydration solution, and this hydration solution can be comprised of a variety of sources such as, non-potable water, sea water, saline water, brackish water, rain or storm water, gray water, waste water from either the downstream process or elsewhere, or a combination of any of these.

The gas stream 402 upon entering the hydration sub-system 401 through the inlet port 418, is passed through the contact zone 404, and comes into contact with the hydration solution stream 408 which is flowing from the hydration solution distribution unit 403, through the contact zone 404 and discharging into the hydration solution collection basin 405. In the contact zone 404, the gas is humidified with water vapor from hydration solution stream 408, and exits the contact zone 404 as humidified gas stream 409. In some aspects, the contact zone 404 comprises of at least one or more of a packing, splash bars, trays, or spray nozzles. In some cases, the extent of saturation of gas stream 409 can be a function of the ambient temperature, the temperature of hydration solution stream 408, surface area of the contact zone 404, and other thermodynamic factors.

The humidified gas stream 409 exits the hydration sub-system 401 through the drift eliminator or demister unit 406, which prevents any non-gaseous fluid (e.g., hydration solution droplets) from being carried out of the hydration sub-system 401 by the gas stream 409. In some aspects, unit 406 prevents the non-gaseous fluid (e.g., hydration solution droplets) from leaving the hydration system 401 and entering downstream processes. In some aspects, unit 406 can function to contain the liquid 408 within the hydration system 401 and minimize or eliminate contamination of the downstream system 414.

Hydration solution stream 408 flowing down the contact zone 404, as well as any hydration solution that has been collected by the drift eliminator or demister unit 406 or a combination thereof, is discharged into the hydration solution collection basin 405. In some cases over time, the hydration solution in the hydration sub-system 401, may become concentrated, as a result of the continual evaporation of pure water. In some cases, as a result of the evaporation process, the hydration solution may become concentrated with non-volatile components, including for example, metals, minerals, ions, suspended solids, organics, dissolved solids and the like. This concentrated hydration solution and the concentrated non-volatiles may be periodically or continually removed from the basin 405 as a slip stream 412, before the pump 413 recycles the hydration solution stream 408 back to the hydration solution distribution unit 403. The hydration solution collection basin 405 may also be periodically or continually supplied with a makeup hydration solution stream 411. In some cases, the source of the makeup hydration solution stream 411 may include at least a portion of fresh water, non-potable water, waste water, gray water, rain or storm water, brackish water, saline water, sea water or the like. In some cases, the hydration solution distribution unit 403, may include at least a portion of a pressurized header system with nozzles to spray the liquid 408 onto the contact zone 404, a non-pressurized or atmospheric basin that feeds nozzles which operate using hydrostatic pressure or head, or a combination thereof.

After the non-gaseous fluid, such as hydration solution droplets, are removed by the unit 406, the humidified gas stream 409 enters the gas-liquid contactor sub-system 414, where it comes in contact with the $CO_2$ capture solution stream 416. At least a portion of the $CO_2$ present in the gas stream 409 reacts with the solution 416 in the sub-system 414. The solution 416 along with the captured $CO_2$ exits the sub-system 414 as liquid stream 417, which is sent for downstream processing, such as for the recovery of captured $CO_2$. The gas stream 409, which is stripped off at least a portion of $CO_2$ in the system 414, exits the sub-system 414 as gas stream 410.

In some aspects, the gas-liquid contactor subsystem 414 is an absorption column or spray tower, in which the humidified $CO_2$ containing gas stream 409 is contacted with a $CO_2$ capture solution stream 416. In some aspects, the $CO_2$ capture solution stream 416 used in the sub-system 414 can be any liquid that can remove at least some $CO_2$ from the gas stream 409, and can include amine solvents, such as, monoethanolamine (MEA), methyldiethanolamine (MDEA), or alkaline solutions, such as, potassium hydroxide, sodium hydroxide. The $CO_2$ capture solution 416 is specifically selected for its ability to capture $CO_2$ from the gas stream 409.

The function of the sub-system 401 is to pre-condition the gas stream 402 before it is sent to the sub-system 414. The stream 402 is humidified upon contacting the hydration solution stream 408 in the sub-system 401. In some aspects, this pre-conditioning helps to reduce evaporative losses from downstream gas-liquid contacting in the sub-system 414, e.g., when the $CO_2$ capture solution stream 416 comes in contact with the gas stream 409. In some aspects, having the hydration sub-system 401 upstream of the gas-liquid contactor sub-system 414 provides a humidified gas stream 409 to the sub-system 414 such that water loss through evaporation is minimized from the $CO_2$ capture solution 416 of the sub-system 414. In some aspects, this could reduce the amount of fresh $CO_2$ capture solution make-up required in the gas-liquid contactor sub-system 414. This makeup stream (not shown in the FIG. 4) may have restrictions on the types of non-water content, including for example the types of ionic species, dissolved and suspended solids, metallic, mineral and organic matter, and the like. These non-water components may have undesirable effects on process performance of sub-system 414, and as such need to be restricted from entry into sub-system 414. Directly adding non-process liquid into sub-system 414, from sources such as those listed as acceptable for sub-system 401, may not be desirable or possible. Additionally, in some aspects where sub-system 414 is operating in hot, dry climates, and/or where it might be desirable to conserve potable or clean water, using sub-system 401 with alternate water sources, such as those used for hydration solution stream 408, as a means of preventing process solution, e.g., $CO_2$ capture solution 416 evaporation from the sub-system 414 allows for the indirect use of alternate water sources without incurring the problems associated with using these sources directly in the sub-system 414.

Figure 5:
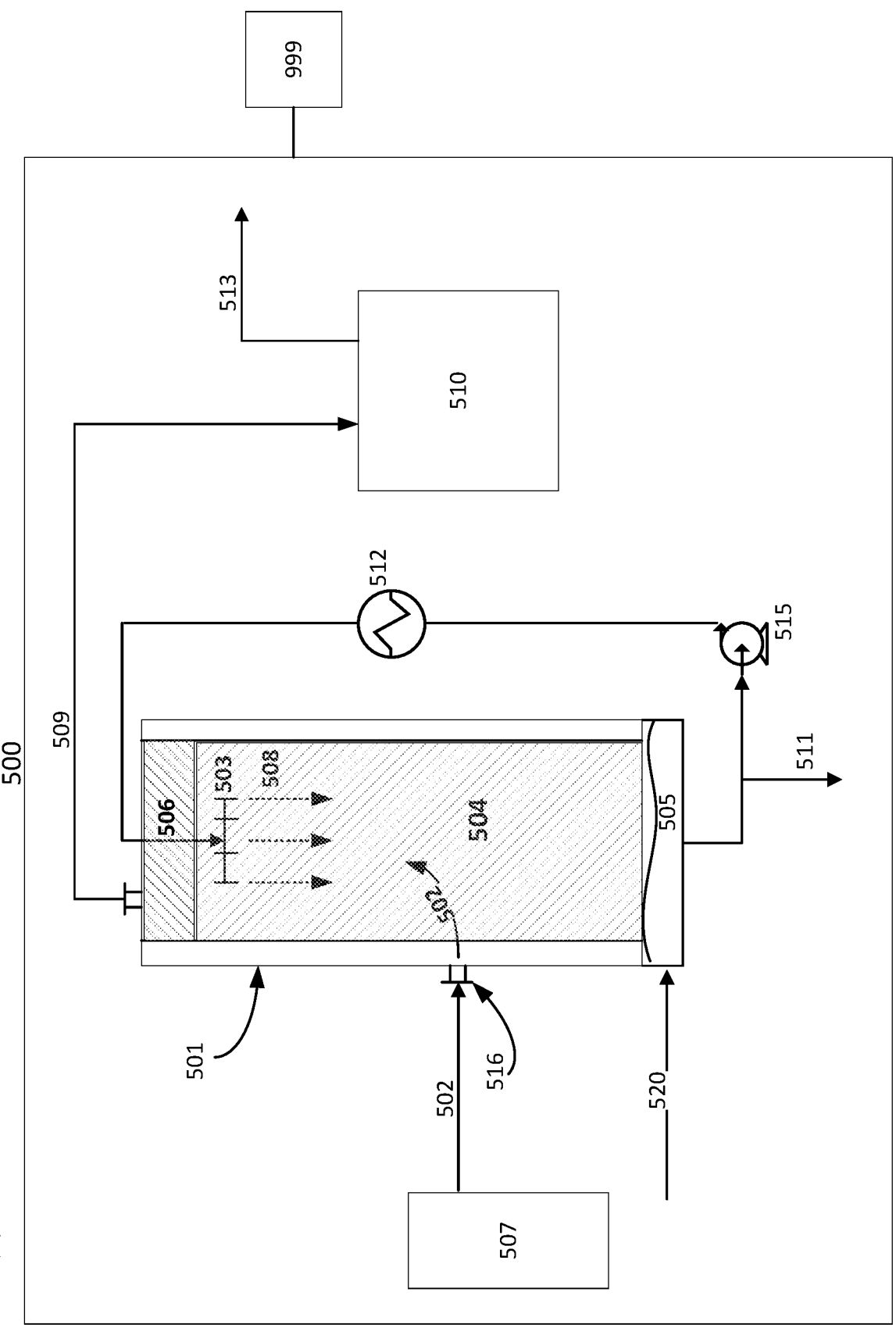
FIG. 5 illustrates an example system and process for humidification of gases in association with a bioreactor system.

Referring to FIG. 5, a bioreactor system 500 includes a hydration sub-system 501 fluidly coupled with a bioreactor vessel 510, where system 510 is configured/purposed for growth of biological material, for example plant or cell-based cultures. The hydration sub-system 501 includes apparatus such as contact zone 504, drift eliminator or demister unit 506, hydration solution distribution unit 503, heat exchanger 512, pump 515, gas inlet port 516 and a hydration solution collection basin 505. The bioreactor system 510 may include apparatus such as bioreactor vessels with liquid stream inlets, mixing impellors, gas spargers and/or inlet ports to feed gases into the bioreactor headspace (not shown in FIG. 5). The hydration sub-system is fed gas stream 502 from a compressed/pressurized source system 507. In some aspects system 500 may include a control system 999 communicably coupled to the components (illustrated or otherwise). In some aspects, the contact zone 504 comprises of at least one or more of a packing, splash bars, trays, or spray nozzles.

In some aspects, the gas stream 502 may contain inert gases and/or nutrients for plant and/or cell culture growth, including mixtures of oxygen, nitrogen and $CO_2$.

One function of the hydration solution stream 508 used in the sub-system 501 is to humidify the gas stream 502 through evaporation of water from the hydration solution, where this hydration solution may be comprised from a variety of sources such as, non-potable water, sea water, saline water, brackish water, rain or storm water, gray water, waste water from either the downstream process or elsewhere, or a combination of any of these.

The gas stream 502 upon entering the hydration sub-system 501 through the inlet port 516, is passed through the contact zone 504, and comes into contact with hydration solution stream 508 which is flowing from the hydration solution distribution unit 503, through the contact zone 504 and discharging into the hydration solution collection basin 505. In the contact zone 504, the gas is humidified with water vapor from hydration solution stream 508, and exits the hydration contact zone 504 as humidified gas stream 509. In some cases, the extent of water saturation of gas stream 509 can be a function of the gas temperature, the temperature of hydration solution stream 508, surface area of the hydration contact zone 504, and other thermodynamic factors. In some aspects, the hydration solution stream 508 can be heated using a heat exchanger 512, prior to being sent to the hydration solution distribution unit 503, in order to optimize the extent of water saturation of gas stream 509. This temperature control mechanism is described further in FIG. 8.

The humidified gas stream 509 exits the hydration sub-system 501 through the drift eliminator or demister unit 506, which prevents any non-gaseous fluid (e.g., hydration solution droplets) from being carried out of the hydration sub-system 501 by the gas stream 509. In some aspects unit 506 prevents hydration solution droplets from leaving the hydration sub-system 501 and entering downstream processes. In some aspects, unit 506 can function to contain the hydration solution 508 within the hydration sub-system 501 and minimize or eliminate contamination of hydration solution/liquid in the downstream system 510.

Hydration solution stream 508 flowing down the contact zone 504, as well as any hydration solution that has been collected by the drift eliminator unit 506 or a combination thereof, is discharged into the hydration solution collection basin 505. In some cases over time, the hydration solution in the hydration sub-system 501, may become concentrated, as a result of the continual evaporation of pure water. In some cases, as a result of the evaporation process, the hydration solution may become concentrated with non-volatile components, including for example, metals, minerals, ions, suspended solids, organics, dissolved solids and the like. This concentrated hydration solution and the concentrated non-volatiles may be periodically or continually removed from the basin as a slip stream 511, before the pump 515 recycles the hydration solution back to the hydration solution distribution unit 503. The collection basin 505 may also be periodically or continually supplied with a makeup hydration solution stream 520. In some cases, the source of the makeup hydration solution stream 520 may include at least a portion of fresh water, non-potable water, waste water, gray water, rain or storm water, brackish water, saline water, sea water or the like. In some cases, the distribution unit 503, may include at least a portion of a pressurized header system with nozzles to spray the hydration solution 508 onto the contact zone 504.

After the hydration solution droplets are removed by the unit 506, the humidified gas stream 509 enters the bioreactor system 510, where it comes in contact with the bioreactor solution (not shown in FIG. 5). At least a portion of the gases present in the gas stream 509 are absorbed into the bioreactor solution in the bioreactor system 510. The gas exits the bioreactor system 510 as gas stream 513.

The function of the sub-system 501 is to pre-condition the gas stream 502 before it is sent to the system 510. The stream 502 is humidified upon contacting the hydration solution stream 508 in the sub-system 501. In some aspects, this pre-conditioning helps to reduce evaporative losses from downstream gas-liquid contacting in system 510, e.g., when the liquid bioreactor solution comes in contact with the gas stream 509. In some aspects, having the hydration sub-system 501 upstream of the bioreactor system 510 provides a humidified gas stream 509 to the system 510 such that water loss through evaporation is minimized from the process solution/liquid of the system 510. In some aspects, this could reduce the amount of fresh solution make-up required in the bioreactor system 510. This makeup stream (not shown in the FIG. 5) may have restrictions on the types of non-water content, including for example the types of ionic species, dissolved and suspended solids, metallic, mineral and organic matter, and the like. The presence of non-water components outside of the system's requirements and/or specifications may have undesirable effects on process performance of system 510, and as such need to be restricted from entry into system 510. Directly adding non-process liquid into system 510, from sources such as those listed as acceptable for hydration sub-system 501, may not be desirable or possible. Additionally, in some aspects where system 510 is operating in hot, dry climates, and/or where it might be desirable to conserve potable or clean water, using sub-system 501 with alternate water sources, such as those used for hydration solution stream 508, as a means of preventing process solution evaporation from system 510 allows for the indirect use of alternate water sources without incurring the problems associated with using these sources directly in system 510.

Figure 6:
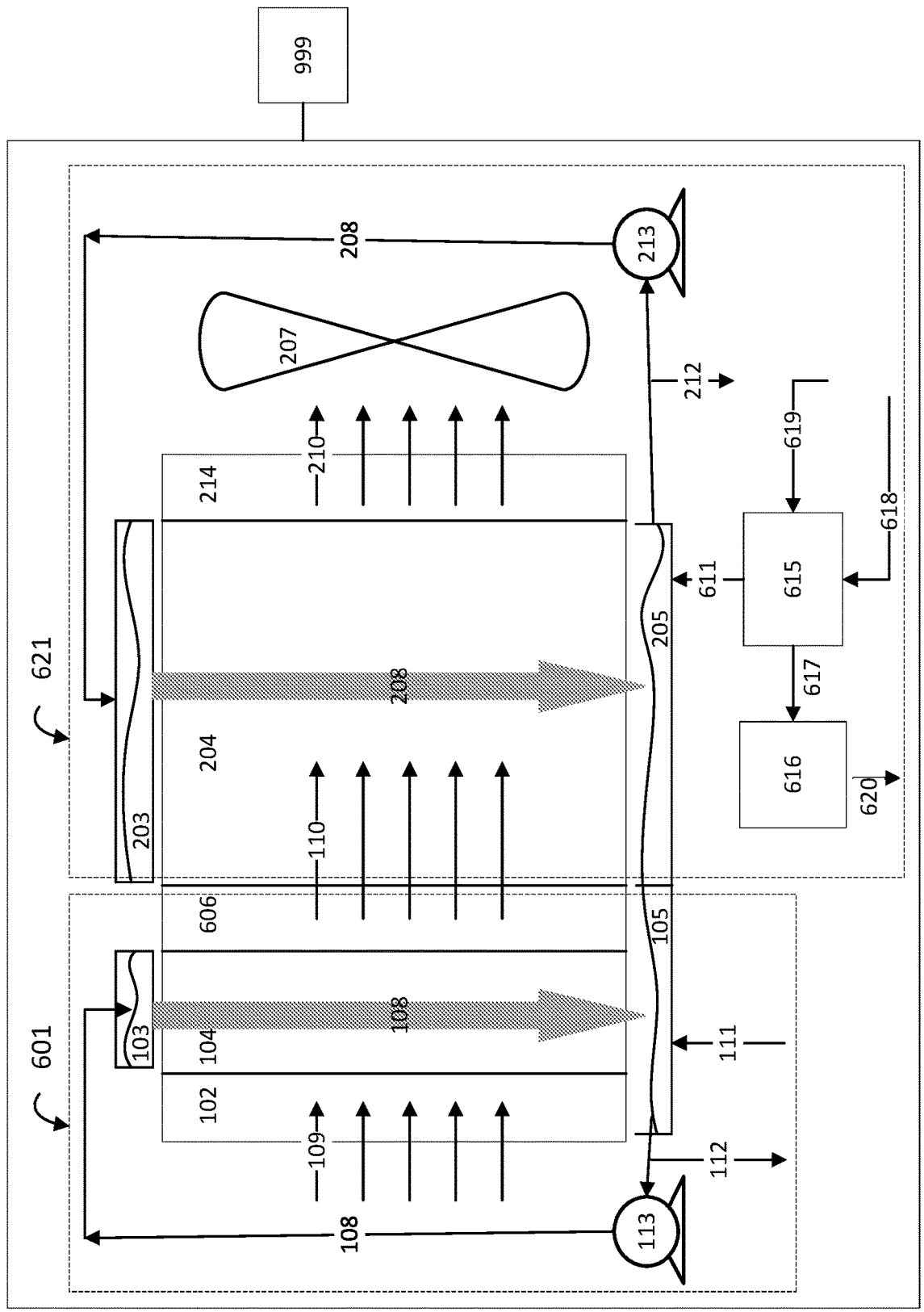
FIG. 6 illustrates an example system and process for humidification of gases in association with a process water evaporator system.

Referring to FIG. 6, a $CO_2$ capture system 600 includes a hydration sub-system 601 coupled with a gas-liquid contactor sub-system 621, where the sub-system 621 is configured/purposed for $CO_2$ capture. The hydration sub-system 601 includes a gas inlet section 102, contact zone 104, drift elimination section 606, hydration solution distribution unit 103, a hydration solution collection basin 105 and a pump 113. The gas-liquid contactor sub-system 621 includes $CO_2$ capture packing 204, drift elimination section 214, $CO_2$ capture solution distribution unit 203, a $CO_2$ capture solution collection basin 205 and an induced draft fan 207. Additionally, the gas-liquid contactor sub-system 621 includes a process solution evaporator unit 615 and a process water condenser and collection unit 616. In some aspects system 600 may include a control system 999 communicably coupled to the components (illustrated or otherwise).

In some cases, the sub-system 621 includes apparatus and process solutions similar to direct air capture systems in existence to date. The $CO_2$ capture solution 208 used in the sub-system 621 is specifically selected for its ability to capture $CO_2$ from gas stream 109. Additionally, the amount and material of construction of contact zone 104 used in the sub-system 601 may be different than the $CO_2$ capture packing 204 used in the sub-system 621, based on the distinctive characteristics and functions required in each of these systems. The main function of the hydration solution stream 108 used in the sub-system 601 is to humidify the gas stream 109 through evaporation of water from the hydration solution, and this hydration solution can be comprised of a variety of sources such as, non-potable water, sea water, saline water, brackish water, rain or storm water, gray water, waste water from either the downstream process or elsewhere, or a combination thereof. In some aspects, the $CO_2$ capture solution stream 208 used in the sub-system 621 can be any liquid that can remove at least some $CO_2$ from the gas stream 109, and can include alkaline solutions, such as, potassium hydroxide, sodium hydroxide, potassium carbonate and potassium bicarbonate; and can include additional components, such as catalysts and enzymes, to improve the $CO_2$ uptake of the liquid solution.

The function of the sub-system 601 is to pre-condition the gas stream 109 before it is sent to the sub-system 621. In some aspects, the gas stream 109 is ambient air that moves through system 600, and in some cases at least a portion of this movement may be generated using an induced draft fan 207, which is a component of the downstream gas-liquid contactor sub-system 621. In some aspects, the fan 207 may be a forced draft fan instead of an induced fan, and as such is placed upstream of the hydration sub-system 601, such that at least a portion of the gas stream 109 is forced through the components of the system 600. In some cases, the gas stream 210 exiting the system 600 may carry a portion of the hydration solution 108, the $CO_2$ capture solution 208, or a combination of both as drift. In the case of an induced draft fan 207, the drift (containing aerosol droplets of one or more of the hydration solution and the $CO_2$ capture solution, which may include salts, hydroxide or other impurities, depending on the hydration solution source and the $CO_2$ capture solution source) may cause fouling, corrosion or other form of deterioration of the fan componentry or housing. In such cases, it may be advantageous to have forced draft fan over an induced draft fan, to reduce the maintenance cost of the fan 207.

The gas stream 109 is humidified upon contacting the hydration solution stream 108 in the sub-system 601. In some aspects, this pre-conditioning helps to reduce evaporative losses from the $CO_2$ capture solution stream 208 when it comes in contact with the gas stream 110. In some aspects, having the hydration sub-system 601 upstream of the gas-liquid contactor sub-system 621 provides a gas stream 110 to the sub-system 621 such that water loss through evaporation is minimized from the $CO_2$ capture solution 208 of the sub-system 621. In some aspects, this could reduce the amount of fresh $CO_2$ capture solution make-up stream 611 required in the gas-liquid contactor sub-system 621. This $CO_2$ capture solution makeup stream 611 may have restrictions on the types of non-water content, including for example the types of ionic species, dissolved and suspended solids, metallic, mineral and organic matter, and the like. These non-water components may have undesirable effects on process performance of sub-system 621, and as such need to be restricted from entry into sub-system 621. Directly adding non-process liquid into the sub-system 621, from sources such as those listed as acceptable for sub-system 601, may not be desirable or possible. Additionally, in some aspects where sub-system 621 is operating in hot, dry climates, and/or where it might be desirable to conserve potable or clean water, using sub-system 601 with alternate water sources, such as those used for the hydration solution stream 108, as a means of preventing process solution, e.g., $CO_2$ capture solution evaporation from sub-system 621 allows for the use of alternate water sources without incurring the problems associated with using these sources directly in sub-system 621.

The gas stream 109 is passed through a gas inlet section 102, and into the contact zone 104. In some aspects, the contact zone 104 comprises of at least one or more of a packing, splash bars, trays, or spray nozzles. In some aspects, the gas inlet section 102 is an inlet louver that is used to keep the hydration solution that is moving from the hydration solution distribution unit 103 through the contact zone 104 and into the hydration solution collection basin 105, from splashing out of the hydration sub-system 601. After passing through the gas inlet section 102, the gas enters the contact zone 104, which is wetted with the hydration solution 108 flowing down from the hydration solution distribution unit 103, through the contact zone 104 and discharging into the hydration solution collection basin 105. In the contact zone 104, the gas stream 109 is contacted with the hydration solution 108 and exits the contact zone 104 as a gas stream 110, which is partially or fully saturated with at least a portion of evaporated hydration solution 108. In some cases, the extent of saturation of gas stream 109 can be a function of the ambient temperature, the temperature of hydration solution stream 108, surface area of the contact zone 104, and other thermodynamic factors. The partially or fully saturated gas stream 110 exits the sub-system 601 through the drift elimination section 606, which prevents any non-evaporated hydration solution (e.g., hydration solution droplets) from being carried out of hydration sub-system 601 by the gas stream 110. In some aspects, the drift elimination section 606 prevents the hydration solution droplets from leaving the hydration sub-system 601 and entering the downstream sub-system 621. In some embodiments, drift elimination section 606 may contain drift eliminator apparatus, inlet louver apparatus like that described in unit 102, or a combination thereof, such that it can function to contain the hydration solution 108 within the contact zone 104 and $CO_2$ capture solution 208 within the $CO_2$ capture packing 204 to minimize or eliminate cross-contamination of both the solutions. In some cases, the section 606 may be designed to reduce the pressure drop across it, by optimizing the portion allocated to drift eliminator function versus inlet louver function. In some instances, parts of the drift elimination section 606 may be a component of the contact zone 104 or the packing 204. In some instances, the packing 204 may include an inlet louver apparatus and the section 606 may include a drift elimination apparatus. In some instances, the contact zone 104 may include a drift eliminator apparatus and the section 606 may include an inlet louver apparatus. In some instances, contact zone 104 and the packing 204 may include drift eliminator apparatus and inlet louver apparatus, respectively, and section 606 is optionally included in the system 600.

Hydration solution stream 108 flowing down the contact zone 104, as well as any non-evaporated hydration solution that has been collected by the gas inlet section 102, the drift elimination section 606 or a combination thereof, is discharged into the hydration solution collection basin 105. In some cases over time, the hydration solution in the hydration sub-system 601, may become concentrated, as a result of the continual evaporation of pure water. In some cases, as a result of the evaporation process, the hydration solution may become concentrated with non-volatile components, including for example, metals, minerals, ions, suspended solids, organics, dissolved solids and the like. This concentrated solution and the concentrated non-volatiles may be periodically or continually removed from the basin as a slip stream 112, before the pump 113 recycles the hydration solution 108 back to the hydration solution distribution unit 103. The collection basin 105 may also be periodically or continually supplied with a makeup hydration solution stream 111. In some cases, the source of the makeup hydration solution stream 111 may include at least a portion of fresh water, non-potable water, waste water, gray water, rain or storm water, brackish water, saline water, sea water or the like. In some cases, the hydration solution distribution unit 103, may include at least a portion of a pressurized header system with nozzles to spray the hydration solution 108 onto the contact zone 104, a non-pressurized or atmospheric basin that feeds nozzles which operate using hydrostatic pressure or head, or a combination thereof.

After the hydration solution droplets are removed by the drift elimination section 606, the gas stream 110 enters the $CO_2$ capture packing 204 where the gas stream 110 comes in contact with the $CO_2$ capture solution 208 which flows down from the $CO_2$ capture solution distribution unit 203 through the $CO_2$ capture packing 204. At least a portion of the $CO_2$ present in the gas stream 110 reacts with the $CO_2$ capture solution 208 in the $CO_2$ capture packing. $CO_2$ capture solution 208 along with the captured $CO_2$ flows through the $CO_2$ capture packing 204 and is collected in the collection basin 205. From the basin, the $CO_2$ capture solution is either recycled in stream 208 to the $CO_2$ capture solution distribution unit 203 using pump 213 and flushed back over the $CO_2$ capture packing 204, or is sent as stream 212 for downstream processing, such as for the recovery of captured $CO_2$. Finally, after having been humidified with water and then having the $CO_2$ removed the gas passes as stream 210 through the second drift elimination section 214 to prevent the escape of $CO_2$ capture solution 208 droplets. In some embodiments, the section 214 may contain drift eliminator apparatus, such that it can function to contain droplets of the $CO_2$ capture solution 208 from being carried away with the gas stream 210 into a downstream process or the atmosphere.

In order to repurpose water content in the $CO_2$ capture solution of the $CO_2$ capture sub-system 621, the process solution evaporator unit 615 is fluidly connected to the $CO_2$ capture solution collection basin 205 as well as to other units within the gas-liquid contactor sub-system 621. This unit 615 is fed process solution stream 619, which comes from one or more units (not shown in FIG. 6) within the system 621, whereby it heats the process solution to evaporate water out of the solution. The water vapor stream 617 exits unit 615 and flows to the condenser and collection unit 616, where it is condensed and sent as a pure water stream 620 to units within the system 621 that need additional fresh water, for example any pellet washing systems, lime slaking systems and the like. The remaining concentrated process solution can be sent to the gas-liquid contactor 621 as make up stream 611.

The evaporation process needs heat, and this heat stream 618 may be provided to unit 615 in the form of indirect heat via electricity, a heat exchanger, combustion of natural gas in a furnace or the like (not shown in FIG. 6), or direct heat through the addition of steam streams from other process units such as reactors, steam turbines, and the like.

In some aspects, the combination of the hydration sub-system 601 with the gas-liquid contactor 621 allows for the direct extraction and redistribution of process water in this manner, as the process no longer needs to add fresh water to make up for evaporative water loss from the gas-liquid contactor sub-system 621.

In some cases, the $CO_2$ capture system 600 may include multiple hydration sub-systems 601 coupled with multiple gas-liquid contactor sub-systems 621. In some aspects, some of the hydration sub-systems are turned on, while the other hydration sub-systems are turned off, as described with reference to FIG. 2. In some cases, this may be based on feedback from measurement and control systems, such as the ones described in FIG. 8 and FIG. 11.

Figure 7:
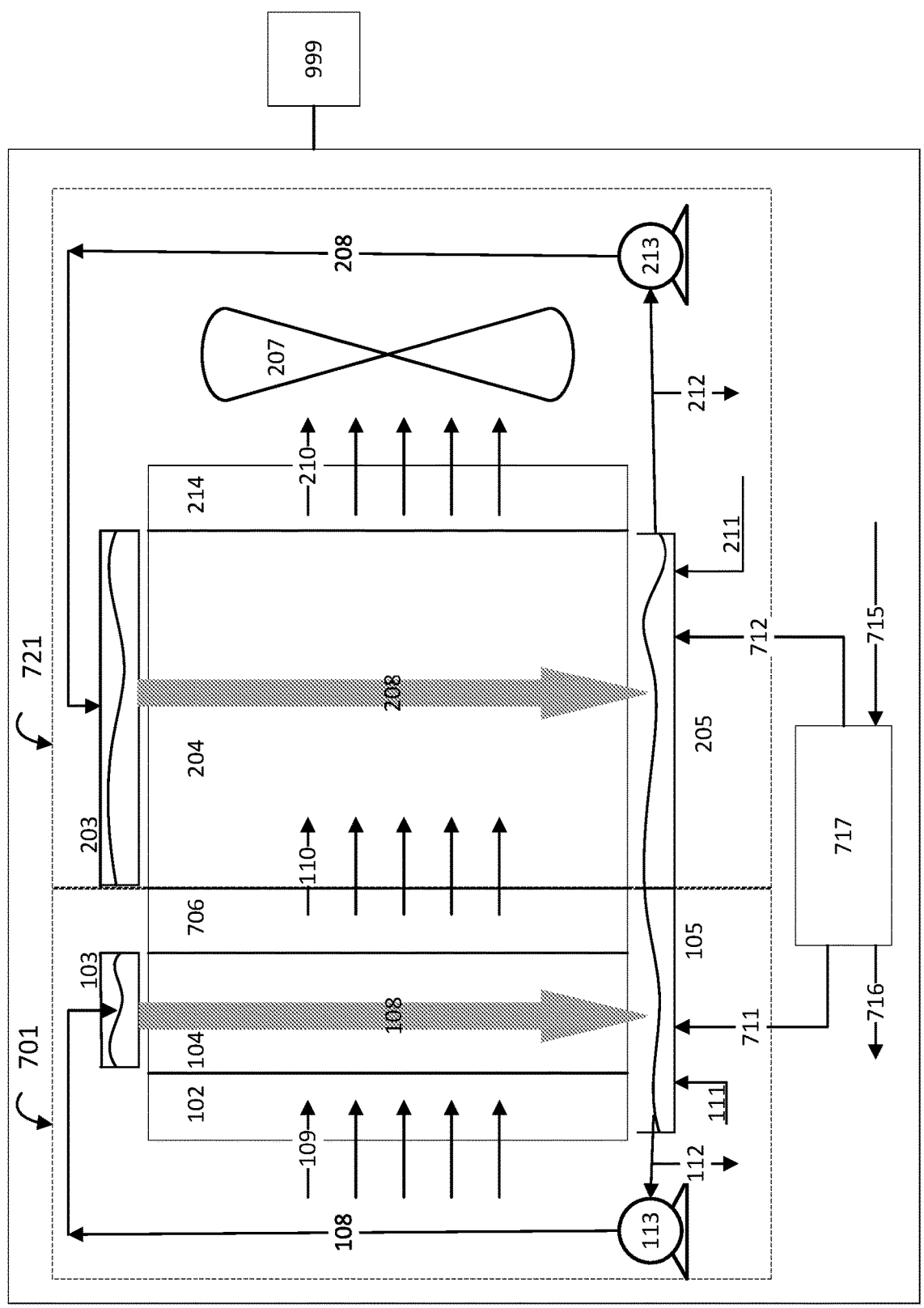
FIG. 7 illustrates an example system and process for humidification of gases in association with a water treatment and filtration system.

Referring to FIG. 7, a $CO_2$ capture system 700 includes a hydration sub-system 701 coupled with a gas-liquid contactor sub-system 721, where the sub-system 721 is configured/purposed for $CO_2$ capture. The hydration sub-system 701 includes a gas inlet section 102, contact zone 104, drift elimination section 706, hydration solution distribution unit 103, a pump 113 and a hydration solution collection basin 105. The gas-liquid contactor sub-system 721 includes $CO_2$ capture packing 204, drift elimination section 214, $CO_2$ capture solution distribution unit 203, a $CO_2$ capture solution collection basin 205, a pump 213 and an induced draft fan 207. Additionally, the $CO_2$ capture system 700 includes a water treatment and filtration unit 717, which is used to supply make-up water to the sub-systems 701 and 721. In some aspects system 700 may include a control system 999 communicably coupled to the components (illustrated or otherwise).

Process waste water stream 715 from processes within sub-systems 701 and 721 is collected and sent to the water treatment and filtration system 717. In some aspects, treated water can be sent as make-up water stream 711 to the sub-system 701, as make-up water stream 712 to the sub-system 721, or a combination thereof. Waste stream 716 from the unit 717 is sent either for downstream processing or disposal. In some aspects, the make-up water stream 711 can be added to the sub-system 701 in addition to the make-up water stream 111 that is sourced from alternate water sources.

In some cases, the sub-system 721 includes apparatus and process solutions similar to direct air capture systems in existence to date. The $CO_2$ capture solution 208 used in the sub-system 721 is specifically selected for its ability to capture $CO_2$ from gas stream 109. Additionally, the amount and material of construction of contact zone 104 used in the sub-system 701 may be different than the $CO_2$ capture packing 204 used in the sub-system 721, based on the distinctive characteristics and functions required in each of these systems. The main function of the hydration solution stream 108 used in the sub-system 701 is to humidify the gas stream 109 through evaporation of water from the hydration solution, and this hydration solution can be comprised of a variety of sources such as, non-potable water, sea water, saline water, brackish water, rain or storm water, gray water, waste water from either the downstream process or elsewhere, or a combination thereof. In some aspects, the $CO_2$ capture solution stream 208 used in the sub-system 721 can be any liquid that can remove at least some $CO_2$ from the gas stream 110, and can include alkaline solutions, such as, potassium hydroxide, sodium hydroxide, potassium carbonate and potassium bicarbonate; and can include additional components, such as catalysts and enzymes, to improve the $CO_2$ uptake of the liquid solution.

The function of the sub-system 701 is to pre-condition the gas stream 109 before it is sent to the sub-system 721. In some aspects, the gas stream 109 is ambient air that moves through system 700, and in some cases at least a portion of this movement may be generated using an induced draft fan 207, which is a component of the downstream gas-liquid contactor sub-system 721. In some aspects, the fan 207 may be a forced draft fan instead of an induced fan, and as such is placed upstream of the hydration sub-system 701, such that at least a portion of the gas stream 109 is forced through the components of the system 700. In some cases, the gas stream 210 exiting the system 700 may carry a portion of the hydration solution 108, the $CO_2$ capture solution 208, or a combination of both as drift. In the case of an induced draft fan 207, the drift (containing aerosol droplets of one or more of the hydration solution and the $CO_2$ capture solution, which may include salts, hydroxide or other impurities, depending on the hydration solution source and the $CO_2$ capture solution source) may cause fouling, corrosion or other form of deterioration of the fan componentry or housing. In such cases, it may be advantageous to have forced draft fan over an induced draft fan, to reduce the maintenance cost of the fan 207.

The gas stream 109 is humidified upon contacting the hydration solution stream 108 in the sub-system 701. In some aspects, this pre-conditioning helps to reduce evaporative losses from the $CO_2$ capture solution stream 208 when it comes in contact with the gas stream 110. In some aspects, having the hydration sub-system 701 upstream of the gas-liquid contactor sub-system 721 provides a gas stream 110 to the sub-system 721 such that water loss through evaporation is minimized from the $CO_2$ capture solution 208 of the sub-system 721. In some aspects, this could reduce the amount of water make-up water stream 712 and fresh $CO_2$ capture solution make-up stream 211 required in the gas-liquid contactor sub-system 721. The make-up streams 211 and 712 may have restrictions on the types of non-water content, including for example the types of ionic species, dissolved and suspended solids, metallic, mineral and organic matter, and the like. These non-water components may have undesirable effects on process performance of sub-system 721, and as such need to be restricted from entry into sub-system 721. Directly adding non-process liquid into the sub-system 721, from sources such as those listed as acceptable for sub-system 701, may not be desirable or possible. Additionally, in some aspects where sub-system 721 is operating in hot, dry climates, and/or where it might be desirable to conserve potable or clean water, using sub-system 701 with alternate water sources, such as those used for the hydration solution stream 108, as a means of preventing process solution, e.g., $CO_2$ capture solution evaporation from sub-system 721 allows for the use of alternate water sources without incurring the problems associated with using these sources directly in sub-system 721.

The gas stream 109 is passed through a gas inlet section 102, and into the contact zone 104. In some aspects, the contact zone 104 comprises of at least one or more of a packing, splash bars, trays, or spray nozzles. In some aspects, the gas inlet section 102 is an inlet louver that is used to keep the hydration solution that is moving from the hydration solution distribution unit 103 through the contact zone 104 and into the hydration solution collection basin 105, from splashing out of the hydration sub-system 701. After passing through the gas inlet section 102, the gas enters the contact zone 104, which is wetted with the hydration solution 108 flowing down from the hydration solution distribution unit 103, through the contact zone 104 and discharging into the hydration solution collection basin 105. In the contact zone 104, the gas stream 109 is contacted with the hydration solution 108 and exits the contact zone 104 as a gas stream 110, which is partially or fully saturated with at least a portion of evaporated hydration solution 108. In some cases, the extent of saturation of gas stream 109 can be a function of the ambient temperature, the temperature of hydration solution stream 108, surface area of the contact zone 104, and other thermodynamic factors. The partially or fully saturated gas stream 110 exits the sub-system 701 through the drift elimination section 706, which prevents any non-evaporated hydration solution (e.g., hydration solution droplets) from being carried out of hydration sub-system 701 by the gas stream 110. In some aspects, the drift elimination section 706 prevents the hydration solution droplets from leaving the hydration sub-system 701 and entering the downstream sub-system 721. In some embodiments, drift elimination section 706 may contain drift eliminator apparatus, inlet louver apparatus like that described in unit 102, or a combination thereof, such that it can function to contain the hydration solution 108 within the contact zone 104 and $CO_2$ capture solution 208 within the $CO_2$ capture packing 204 to minimize or eliminate cross-contamination of both the solutions. In some cases, the section 706 may be designed to reduce the pressure drop across it, by optimizing the portion allocated to drift eliminator function versus inlet louver function. In some instances, parts of the drift elimination section 706 may be a component of the contact zone 104 or the packing 204. In some instances, the packing 204 may include an inlet louver apparatus and the section 706 may include a drift elimination apparatus. In some instances, the contact zone 104 may include a drift eliminator apparatus and the section 706 may include an inlet louver apparatus. In some instances, contact zone 104 and the packing 204 may include drift eliminator apparatus and inlet louver apparatus, respectively, and section 706 is optionally included in the system 700.

Hydration solution stream 108 flowing down the contact zone 104, as well as any non-evaporated hydration solution that has been collected by the gas inlet section 102, the drift elimination section 706 or a combination thereof, is discharged into the hydration solution collection basin 105. In some cases over time, the hydration solution in the hydration sub-system 701, may become concentrated, as a result of the continual evaporation of pure water. In some cases, as a result of the evaporation process, the hydration solution may become concentrated with non-volatile components, including for example, metals, minerals, ions, suspended solids, organics, dissolved solids and the like. This concentrated solution and the concentrated non-volatiles may be periodically or continually removed from the basin as a slip stream 112, before the pump 113 recycles the hydration solution 108 back to the hydration solution distribution unit 103. The collection basin 105 may also be periodically or continually supplied with a makeup water stream 111. In some embodiments, the source of the makeup water stream 111 may include at least a portion of fresh water, non-potable water, waste water, gray water, rain or storm water, brackish water, saline water, sea water or the like. In some cases, the hydration solution distribution unit 103, may include at least a portion of a pressurized header system with nozzles to spray the hydration solution 108 onto the contact zone 104, a non-pressurized or atmospheric basin that feeds nozzles which operate using hydrostatic pressure or head, or a combination thereof.

After the hydration solution droplets are removed by the drift elimination section 706, the gas stream 110 enters the $CO_2$ capture packing 204 where the gas stream 110 comes in contact with the $CO_2$ capture solution 208 which flows down from the $CO_2$ capture solution distribution unit 203 through the $CO_2$ capture packing 204. At least a portion of the $CO_2$ present in the gas stream 110 reacts with the $CO_2$ capture solution 208 in the $CO_2$ capture packing. $CO_2$ capture solution 208 along with the captured $CO_2$ flows through the $CO_2$ capture packing 204 and is collected in the collection basin 205. From the basin, the $CO_2$ capture solution is either recycled in stream 208 to the $CO_2$ capture solution distribution unit 203 using pump 213 and flushed back over the $CO_2$ capture packing 204, or is sent as stream 212 for downstream processing, such as for the recovery of captured $CO_2$. Finally, after having been humidified with water and then having the $CO_2$ removed the gas passes as stream 210 through the second drift elimination section 214 to prevent the escape of $CO_2$ capture solution 208 droplets. In some embodiments, the section 214 may contain drift eliminator apparatus, such that it can function to contain droplets of the $CO_2$ capture solution 208 from being carried away with the gas stream 210 into a downstream process or the atmosphere.

In some cases, the $CO_2$ capture system 700 may include multiple hydration sub-systems 701 coupled with multiple gas-liquid contactor sub-systems 721. In some aspects, some of the hydration sub-systems are turned on, while the other hydration sub-systems are turned off, as described with reference to FIG. 2. In some cases, this may be based on feedback from measurement and control systems, such as the ones described in FIG. 8 and FIG. 11.

Figure 8:
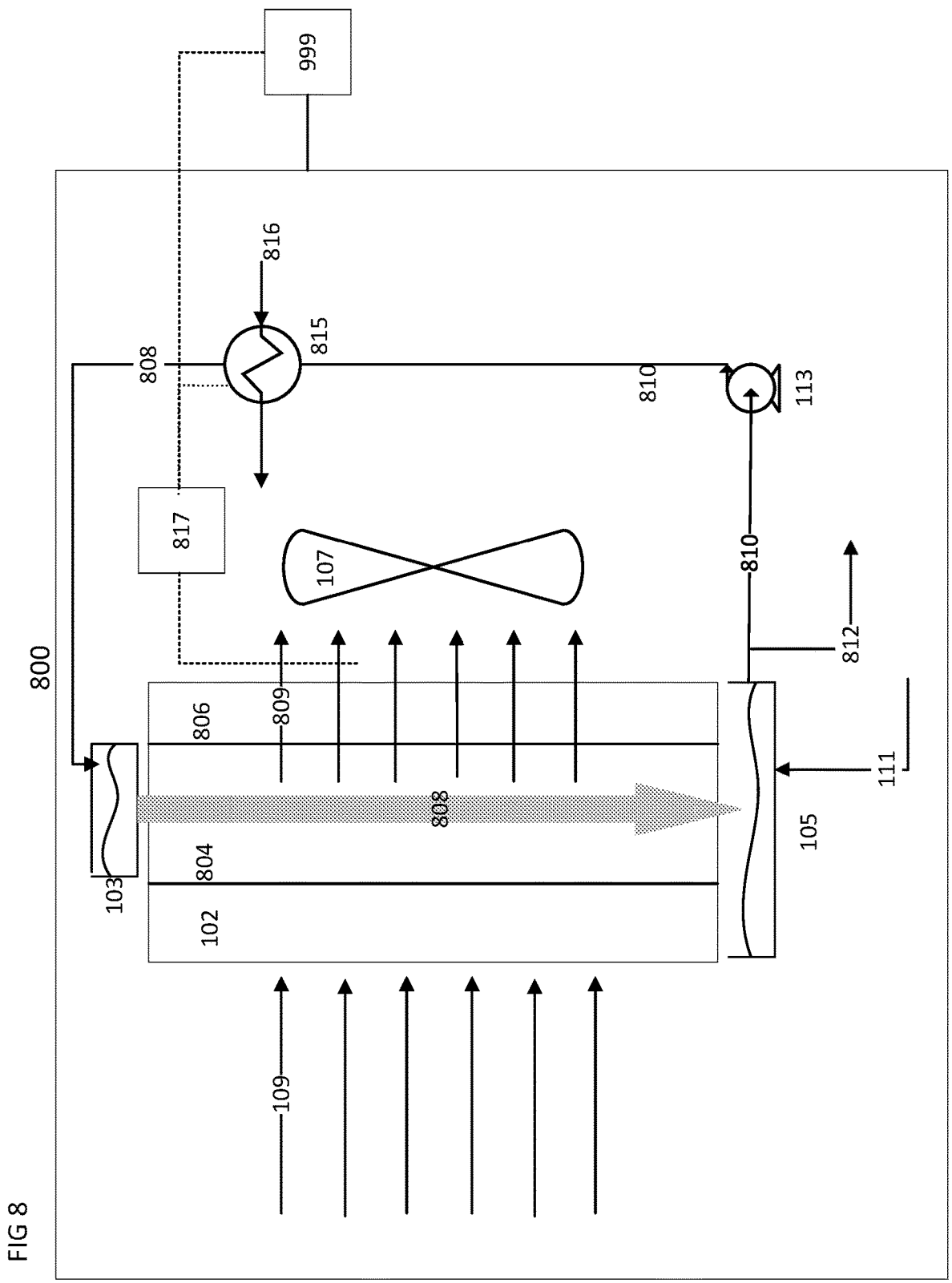
FIG. 8 illustrates an example system and process for humidification of gases in association with a heat exchanger and temperature control system.

Referring to FIG. 8, a hydration system 800 for the humidification of a gas stream 109, includes a gas inlet section 102, contact zone 804, drift elimination section 806, hydration solution distribution unit 103, a hydration solution collection basin 105, a pump 113, a heat exchanger 815, a gas analysis unit 817 and a fan 107. In some cases, the hydration solution 808 used in the system 800 can include portions of one or more of types of water, such as, non-potable water, sea water, saline water, brackish water, rain or storm water, gray water or waste water. In some aspects system 800 may include a control system 999 communicably coupled to the components (illustrated or otherwise). In some aspects, the contact zone 804 comprises of at least one or more of a packing, splash bars, trays, or spray nozzles.

In some aspects, the gas stream 109 is ambient air that moves through the system 800 using an induced draft fan 107. In some cases, the induced draft may be generated by other mechanical means, for example by a blower. In some cases, the fan 107 may not be directly interfaced with the hydration system 800 and may be a component of a downstream process, such that at least a portion of the gas stream 809 exiting the hydration system 800 is fed into a downstream process. In some aspects, the fan 107 may be a forced draft fan instead of an induced fan, and as such is placed upstream of the hydration system 800, such that at least a portion of the gas stream 109 is forced through the components of the system 800. In some cases, the gas stream 809 exiting the system 800 may carry a portion of the hydration solution 808 as drift. In the case of an induced draft fan 107, the drift (containing aerosol droplets of hydration solution, which may include salts or other impurities, depending on the hydration solution source) may cause fouling, corrosion or other form of deterioration of the fan componentry or housing. In such cases, it may be advantageous to have forced draft fan over an induced draft fan, to reduce the maintenance cost of the fan 107.

In some aspects, the function of the system 800 is to pre-condition the gas stream 109 before it is sent to a downstream process. The stream 109 is humidified upon contacting the hydration solution stream 808 in the system 800. In some aspects, this pre-conditioning helps to reduce evaporative losses from a liquid solution used in the downstream process when it comes in contact with the gas stream 809. In some aspects, having the hydration system 800 upstream of the process provides a gas stream 809 to the downstream process such that water loss through evaporation is minimized from the process solution of the downstream process. In some aspects, this could reduce the amount of fresh solution make-up required in the downstream process. This fresh solution make-up may have restrictions on the types of non-water content, including for example the types of ionic species, dissolved and suspended solids, metallic, mineral and organic matter, and the like. These non-water components may have undesirable effects on performance of the downstream process, and as such need to be restricted from entry into the downstream process. Directly adding non-process liquid into the downstream process, from sources such as those listed as acceptable for system 800, may not be desirable or possible. Additionally, in some aspects where the downstream process is operating in hot, dry climates, and/or where it might be desirable to conserve potable or clean water, using system 800 with alternate water sources, such as those used for hydration solution stream 808, as a means of preventing process solution evaporation from the downstream process allows for the use of alternate water sources without incurring the problems associated with using these sources directly in the downstream process.

The gas stream 109 is passed through the gas inlet section 102, and into the contact zone 804. In some aspects, the gas inlet section 102 is an inlet louver that is used to keep the hydration solution that is moving from the distribution unit 103 through the contact zone 804 and into the hydration solution collection basin 105, from splashing out of the hydration system 800. After passing through the gas inlet section 102, the gas enters the contact zone 804, which is wetted with hydration solution 808 flowing down from the hydration solution distribution unit 103, through the contact zone 804 and discharging into the hydration solution collection basin 105. In the contact zone 804, the gas stream 109 is contacted with the hydration solution 808, and exits the contact zone 804 as a gas stream 809, which is partially or fully saturated with at least a portion of evaporated hydration solution 808. In some cases, the extent of saturation of gas stream 809 can be a function of the ambient temperature, the temperature of hydration solution stream 808, surface area of the contact zone 804, and other thermodynamic factors.

The gas analysis unit 817 is a measurement device, which can be used to monitor properties of the gas stream 809, including for example the temperature and humidity of the gas stream 809 exiting the system 800. The measurement data along with similar data from a downstream process can be used to control the operation of the heat exchanger 815.

In some aspects, the downstream process is another gas-liquid contacting system, such as, system 200 described in the FIG. 2. In such case, data collected by the unit 817 may be used to maintain the temperature of the hydration solution stream 808 at a similar or higher temperature than the hydration solution 208 used in the system 200 (not shown in FIG. 8). Hydration solution stream 808 leaving the heat exchanger 815 is pumped back to the hydration solution distribution unit 103 and passed through the contact zone 804, where it comes in contact with the inlet gas stream 109. As the gas and hydration solution mix, sensible heat from the hydration solution stream 808 is transferred to the gas, which in turn enhances the moisture carrying capacity of the gas. The hydration solution loses heat in this process, and is collected as hydration solution stream 810 in the collection basin 105. The stream 810 is heated upon passing through the heat exchanger 815 using a heat stream 816, and the heated hydration solution 808 is sent to the hydration solution distribution unit 103. In some aspects, the heat stream 816 is waste heat from processes downstream of the hydration system.

The gas stream 809 exiting the system 800 would have a more controlled moisture content than when exiting a system without the heat exchanger 815, such as, system 100 as shown in FIG. 1. This ability to control and/or increase the water vapor content of stream 809 exiting the system 800 would reduce water loss in the downstream process, such as 200 (not shown in FIG. 8), which would then require less make-up water. In some aspects, controlled heating and humidification of gas stream 109 would enable for less contact zone material 804 required to carry out the required gas humidification process, which would save costs and perhaps even make the unit 800 footprint smaller. In some aspects, less volume of contact zone 804 also means lower pressure drop through the unit 800, which would reduce energy requirements.

The partially or fully saturated gas stream 809 exits the system 800 through the drift elimination section 806, which prevents any non-evaporated hydration solution (e.g., hydration solution droplets) from being carried out of hydration system 800 by the gas stream 809. In some aspects, the drift elimination section 806 is a drift eliminator that prevents hydration solution droplets from leaving the hydration system 800 and entering any downstream processes.

Hydration solution stream 808 flowing down the contact zone 804, as well as any hydration solution that has been collected by the gas inlet section 102, the drift elimination section 806 or a combination thereof, is discharged into the hydration solution collection basin 105. In some cases over time, the hydration solution in the hydration system 800, may become concentrated, as a result of the continual evaporation of pure water. In some cases, as a result of the evaporation process, the hydration solution may become concentrated with non-volatile components, including for example, metals, minerals, ions, suspended solids, organics, dissolved solids and the like. This concentrated hydration solution and the concentrated non-volatiles may be periodically or continually removed from the basin 105 as a slip stream 812, before the pump 113 recycles the hydration solution 810 back to the hydration solution distribution unit 103 via the heat exchanger 815. The collection basin 105 may also be periodically or continually supplied with a makeup hydration solution stream 111. In some cases, the source of the makeup hydration solution stream 111 may include at least a portion of fresh water, non-potable water, waste water, gray water, rain or storm water, brackish water, saline water, sea water or the like. In some cases, the distribution unit 103, may include at least a portion of a pressurized header system with nozzles to spray the hydration solution 808 onto the contact zone 804, a non-pressurized or atmospheric basin that feeds nozzles which operate using hydrostatic pressure or head, or a combination thereof.

In some cases, the system 800 may be fluidly coupled to one or more downstream processes, including but not limited to $CO_2$ capture units, including $CO_2$ capture units that use sorbent technology, liquid capture technology or a combination thereof, $CO_2$ capture units for both dilute and point source (concentrated) applications, bioreactors, or a combination thereof.

In some cases, the heat exchange and control concept described in this embodiment can be applied to other configurations of the hydration subsystem, such as the configurations shown in FIGS. 1 through 7.

Figure 9:
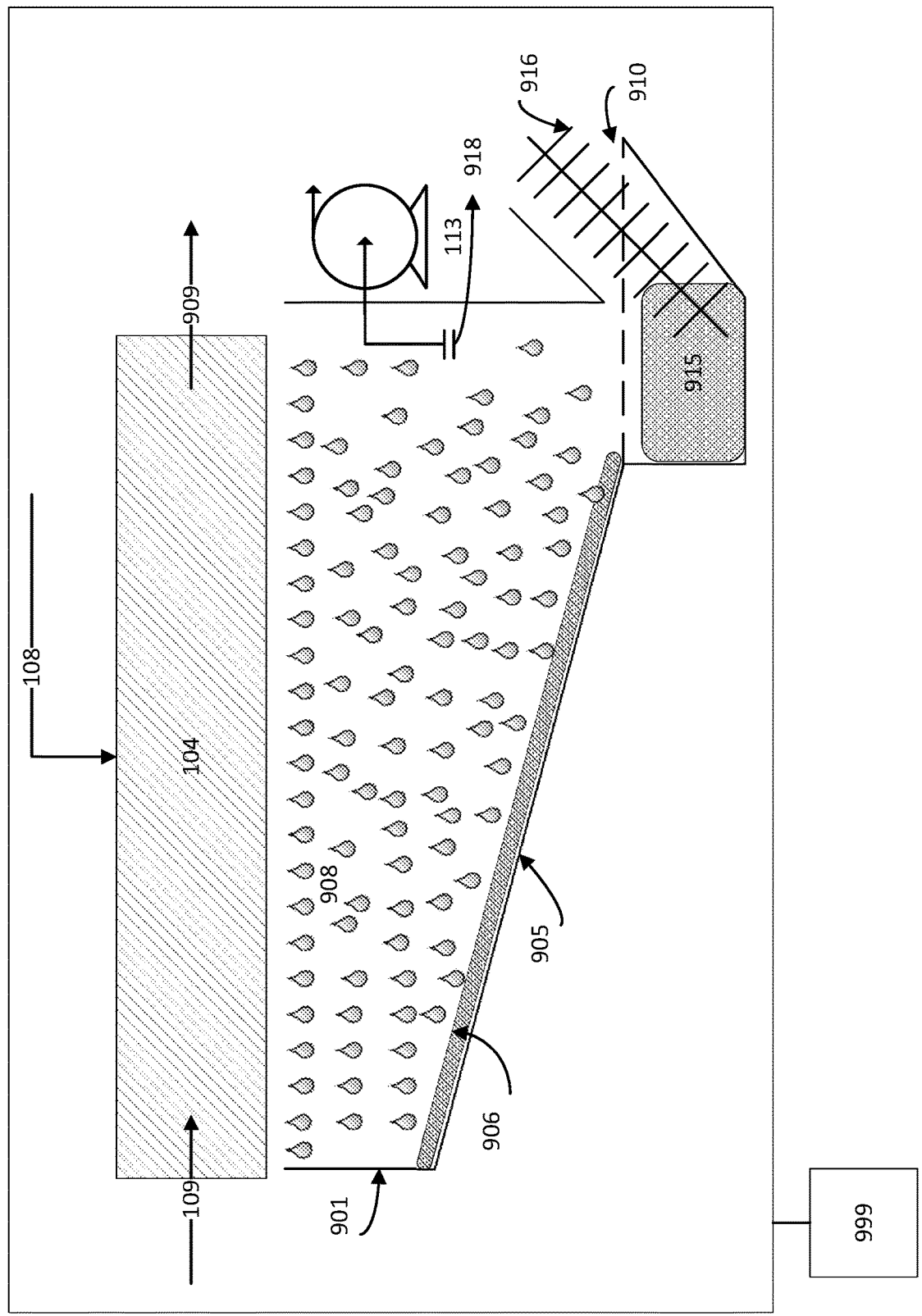
FIG. 9 depicts an illustrative embodiment of an inclined surface liquid collection basin for removal of solids from the liquid in association with an example process for humidification of gases.

Referring to FIG. 9, a hydration solution basin collection system 900 for settling, collection and removal of solids is described with respect to illustrative system 900, where system 900 is fluidly coupled to a hydration system as described in FIGS. 1 to 8. The hydration solution collection basin 901 is fluidly coupled to contact zone 104, an inclined bottom basin area 905, a hydration solution redistribution pump 113 and associated suction intake and piping 918, and a solids collection basin 915. The solids collection basin is fluidly coupled to a mechanical removal system 916. In some aspects system 900 may include a control system 999 communicatively coupled to the components (illustrated or otherwise). In some aspects, the contact zone 104 comprises of at least one or more of a packing, splash bars, trays, or spray nozzles.

In some aspects, hydration solution stream 108 may include lower quality water, such as, non-potable water, brackish water, storm water, gray water or process waste water, and could also contain suspended solids, for example, particulates entrained from the makeup water source, and/or particulates captured by the hydration solution from the gas stream 109. In some aspects, the gas stream 109 is ambient air that moves through the contact zone 104, gets humidified upon contacting the hydration solution 108 in the packing, and exits the packing as humidified gas stream 909. In some aspects, the gas stream 909 is sent to a downstream process, such as a $CO_2$ capture unit.

Stream 108 flows through contact zone 104, is distributed and falls off the packing as small drops and/or trickles of hydration solution, 908, into the hydration solution basin collection unit 901, where it comes into contact with the inclined bottom basin area 905. Some amount of particulates in hydration solution stream 108 will settle out onto the basin area 905, in particular when the hydration solution flow rate across the basin towards a suction intake of the pump 113 and piping 918 is low enough, the particulate settling velocity is high enough, and the distance to the pump's suction intake and piping 918 is far enough to enable settling of the particulates out of the hydration solution flow before it reaches the pump's suction intake and piping 918.

In some aspects, the basin bottom area 905 is inclined such that it remains largely above the hydration solution level 910, of the bottom basin, and as a result, a solids layer 906, accumulates. The motion of the hydration solution droplets 908 as they splash onto the inclined basin surface 905 is such that it displaces some of the solid layer 906 in a downward direction towards the solids collection basin(s) 915. The solid collection basin could contain a mechanical removal system 916, for example an auger, screw conveyor, progressive cavity pump, screw pumps, high density solids pump such as reciprocating pumps, or the like, which removes the solids material from the basin.

In some embodiments, the basin collection unit 901 may be the same shape and size as the footprint of the contact zone 104, for example rectangular if the packing footprint is rectangular or circular if the packing footprint is circular, to ensure proper collection of the hydration solution. In some embodiments, at least one of the inclined bottom basin 905 and the solid collection basin(s) 915 allow for solids collection to take place in non-circular shapes of the footprint of the basin collection system 901.

In some types of commercial solids separation systems, for example clarifier settling tank designs, a circular footprint may be necessary to gain full advantage of the use of solids removal equipment such as sludge raking or suction systems, where a circular sweeping pattern can remove solids with fewer dead zones from the circular footprint that from a non-circular footprint.

In some aspects, the hydration solution basin collection system 901 described within this embodiment may be incorporated into any of the other embodiments described in FIGS. 1-8 and 10-12.

Figure 10:
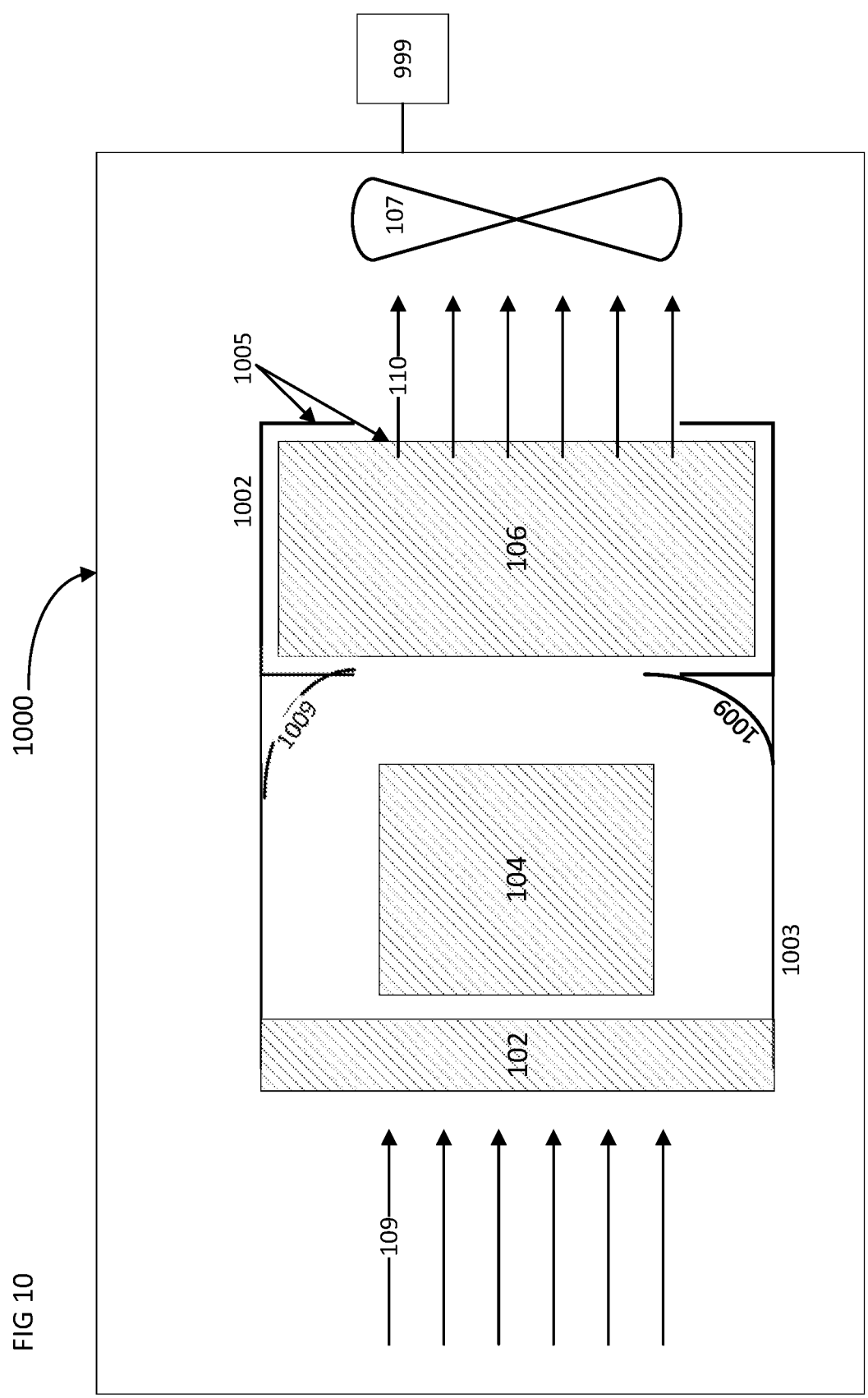
FIG. 10 depicts an illustrative embodiment of a drift elimination and sealant configuration fitted between the contact zone material, overall housing in association with an example process for humidification of gases.

Referring to FIG. 10, a hydration system 1000 for the humidification of a gas stream 109, includes a gas inlet section 102, flexible seals 1009 fitted between the contact zone 104 and the drift elimination section 106. Along with the drift elimination section 106, the flexible seals minimize the bypass of gas stream 109 around the drift elimination section 106, and leakage from the hydration system 1000. In some aspects system 1000 may include a control system 999 communicably coupled to the components (illustrated or otherwise). In some aspects, the contact zone 104 comprises of at least one or more of a packing, splash bars, trays, or spray nozzles. In some aspects, the gas inlet section 102 is an inlet louver. In some aspects, the drift elimination section 106 is a drift eliminator that prevents hydration solution droplets from leaving the hydration system 1000 and entering any downstream processes.

The drift elimination section 106 is coupled to a prefabricated frame assembly 1002, which is also coupled to flexible seals 1009 as part of a frame and drift assembly 1005, which is coupled to the hydration system structure walls 1003. The flexible seal material 1009 is attached to the framed drift elimination section assembly 1005 to further reduce gas bypass, resulting in substantially no gas gaps, around the drift elimination section 106.

In some aspects, the gas stream 109 is ambient air that is induced through the system 1000 using an induced draft fan 107. The fan 107 may not be fluidly coupled to the system 1000 and may be a component of a downstream process, such that the gas stream 110 exiting the system 1000 is fed into the downstream process. In some aspects, the fan 107 may be a forced draft fan instead of an induced fan, and as such is placed upstream of the hydration system 1000, such that at least a portion of the gas stream 109 is forced through the components of the system 1000. In some cases, the gas stream 110 exiting the system 1000 may carry a portion of the process solution used in the system 1000 as drift. In the case of an induced draft fan 107, the drift (containing aerosol droplets of process solution, which may include salts or other impurities, depending on the process solution source) may cause fouling, corrosion or other form of deterioration of the fan componentry or housing. In such cases, it may be advantageous to have forced draft fan over an induced draft fan, to reduce the maintenance cost of the fan 107. In some cases, the process solution used in system 1000 may be the hydration solution 108, as described in FIG. 1.

In some aspects, the flexible seals 1009 and/or the frame and drift assembly 1005 described within this embodiment may be incorporated into any of the other embodiments described and shown in FIGS. 1 through 12A-12B.

Figure 11:
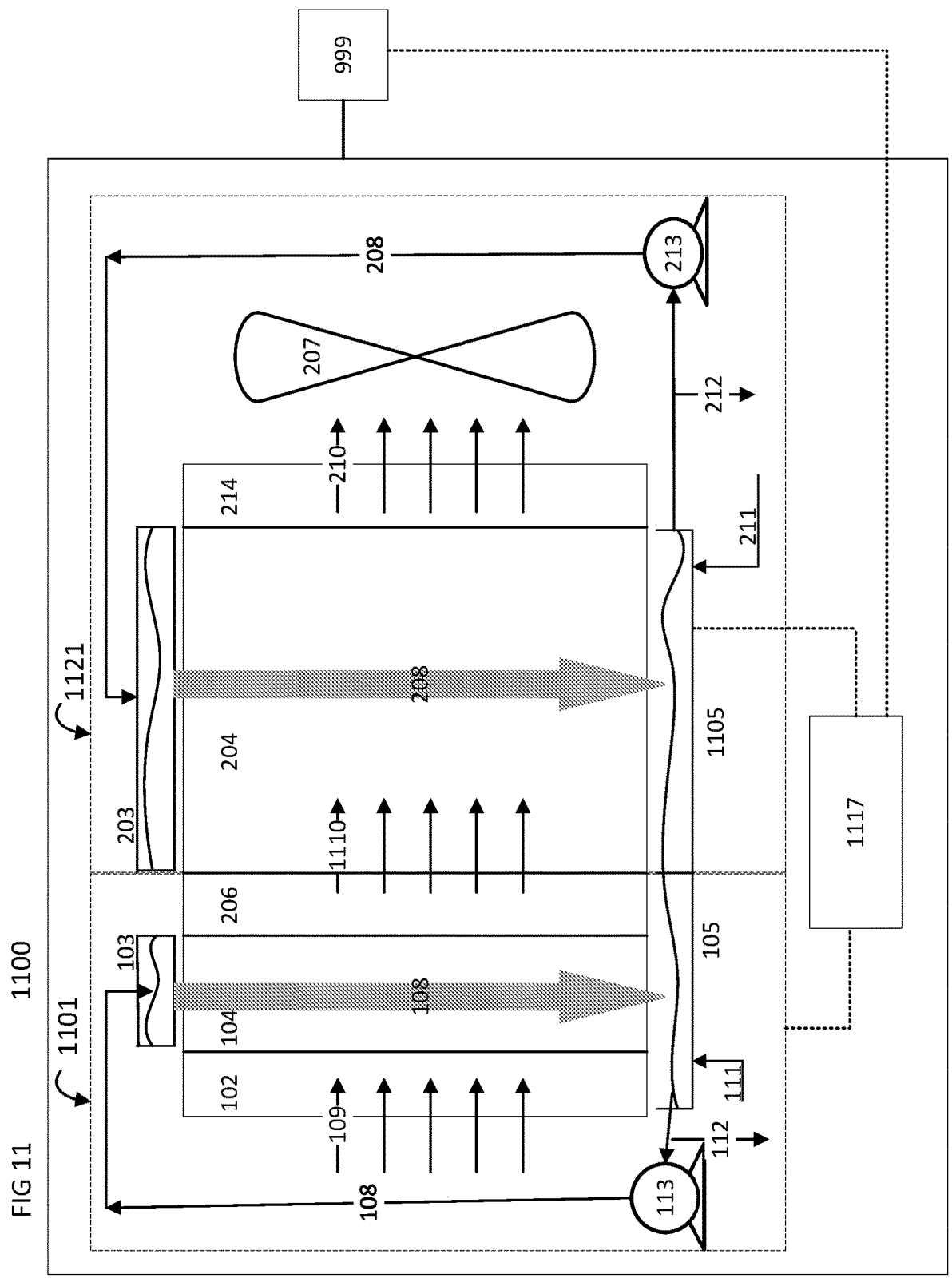
FIG. 11 illustrates an example system and process for humidification of gases in association with a solution level measurement device

Referring to FIG. 11, a $CO_2$ capture system 1100 includes a hydration sub-system 1101 coupled with a gas-liquid contactor sub-system 1121, where the sub-system 1121 is configured/purposed for $CO_2$ capture. The hydration sub-system 1101 includes a gas inlet section 102, contact zone 104, drift elimination section 206, hydration solution distribution unit 103, a hydration solution collection basin 105 and a pump 113. The gas-liquid contactor sub-system 1121 includes $CO_2$ capture packing 204, drift elimination section 214, $CO_2$ capture solution distribution unit 203, a pump 213, a $CO_2$ capture solution collection basin 1105, a $CO_2$ capture solution level measurement device 1117 and an induced draft fan 207. In some aspects system 1100 may include a control system 999 communicably coupled to the components (illustrated or otherwise).

In some cases, the sub-system 1121 includes apparatus and process solutions similar to direct air capture systems in existence to date. The $CO_2$ capture solution 208 used in the sub-system 1121 is specifically selected for its ability to capture $CO_2$ from gas stream 109. Additionally, the amount and material of construction of contact zone 104 used in the sub-system 1101 may be different than the $CO_2$ capture packing 204, based on the distinctive characteristics and functions required in each of these systems. The main function of the hydration solution stream 108 used in the sub-system 1101 is to humidify the gas stream 109 through evaporation of water from the hydration solution, and this hydration solution can be comprised of a variety of sources such as, non-potable water, sea water, saline water, brackish water, rain or storm water, gray water, waste water from either the downstream process or elsewhere, or a combination thereof. In some aspects, the $CO_2$ capture solution stream 208 used in the sub-system 1121 can be any liquid that can remove at least some $CO_2$ from the gas stream 1110, and can include alkaline solutions, such as, potassium hydroxide, sodium hydroxide, potassium carbonate and potassium bicarbonate; and can include additional components, such as catalysts and enzymes, to improve the $CO_2$ uptake of the liquid solution.

The function of the sub-system 1101 is to pre-condition the gas stream 109 before it is sent to the sub-system 1121. In some aspects, the gas stream 109 is ambient air that moves through system 1100, and in some cases at least a portion of this movement may be generated using an induced draft fan 207, which is a component of the downstream gas-liquid contactor sub-system 1121. In some aspects, the fan 207 may be a forced draft fan instead of an induced fan, and as such is placed upstream of the hydration sub-system 1101, such that at least a portion of the gas stream 109 is forced through the components of the system 1100. In some cases, the gas stream 210 exiting the system 1100 may carry a portion of the hydration solution 108, the $CO_2$ capture solution 208, or a combination of both as drift. In the case of an induced draft fan 207, the drift (containing aerosol droplets of one or more of the hydration solution and the $CO_2$ capture solution, which may include salts, hydroxide or other impurities, depending on the hydration solution source and the $CO_2$ capture solution source) may cause fouling, corrosion or other form of deterioration of the fan components or housing. In such cases, it may be advantageous to have forced draft fan over an induced draft fan, to reduce the maintenance cost of the fan 207.

The gas stream 109 is humidified upon contacting the hydration solution stream 108 in the sub-system 1101. In some aspects, this pre-conditioning helps to reduce evaporative losses from the $CO_2$ capture solution stream 208 when it comes in contact with the gas stream 1110. In some aspects, having the hydration sub-system 1101 upstream of the gas-liquid contactor sub-system 1121 provides a gas stream 1110 to the sub-system 1121 such that water loss through evaporation is minimized from the $CO_2$ capture solution 208 of the sub-system 1121. In some aspects, this could reduce the amount of fresh $CO_2$ capture solution make-up stream 211 required in the gas-liquid contactor sub-system 1121. This $CO_2$ capture solution makeup stream 211 may have restrictions on the types of non-water content, including for example the types of ionic species, dissolved and suspended solids, metallic, mineral and organic matter, and the like. These non-water components may have undesirable effects on process performance of sub-system 1121, and as such need to be restricted from entry into sub-system 1121. Directly adding non-process liquid into sub-system 1121, from sources such as those listed as acceptable for sub-system 1101, may not be desirable or possible. Additionally, in some aspects where sub-system 1121 is operating in hot, dry climates, and/or where it might be desirable to conserve potable or clean water, using sub-system 1101 with alternate water sources, such as those used for the hydration solution stream 108, as a means of preventing process solution, e.g., $CO_2$ capture solution evaporation from sub-system 1121 allows for the use of alternate water sources without incurring the problems associated with using these sources directly in sub-system 1121.

The gas stream 109 is passed through a gas inlet section 102, and into the contact zone 104. In some aspects, the contact zone 104 comprises of at least one or more of a packing, splash bars, trays, or spray nozzles. In some aspects, the gas inlet section 102 is an inlet louver that is used to keep the hydration solution 108 that is moving from the distribution unit 103 through the contact zone 104 and into the collection basin 105, from splashing out of the hydration sub-system 1101. After passing through the gas inlet section 102, the gas enters the contact zone 104, which is wetted with the hydration solution 108 flowing down from the hydration solution distribution unit 103, through the contact zone 104 and discharging into the hydration solution collection basin 105. In the contact zone 104, the gas stream 109 is contacted with the hydration solution 108 and exits the contact zone 104 as a gas stream 1110, which is partially or fully saturated with at least a portion of evaporated hydration solution 108. In some cases, the extent of saturation of gas stream 109 can be a function of the ambient temperature, the temperature of hydration solution stream 108, surface area of the contact zone 104, and other thermodynamic factors. The partially or fully saturated gas stream 1110 exits the sub-system 1101 through the drift elimination section 206, which prevents the majority of non-evaporated hydration solution (e.g., hydration solution droplets) from being carried out of hydration sub-system 1101 by the gas stream 1110. In some aspects, the drift elimination section 206 prevents hydration solution droplets from leaving the hydration sub-system 1101 and entering the downstream sub-system 1121. In some implementations, section 206 may contain one or more drift eliminator apparatus, inlet louver apparatus similar to described in section 102, or a combination thereof, such that section 206 can function to contain the hydration solution 108 within the contact zone 104 and $CO_2$ capture solution 208 within the $CO_2$ capture packing 204 to minimize or eliminate cross-contamination of both the solutions. In some cases, the section 206 may be designed to reduce the pressure drop across it, by optimizing the portion allocated to drift eliminator function versus inlet louver function. In some instances, parts of the drift elimination section 206 may be a component of the contact zone 104 or the packing 204. In some instances, the packing 204 may include an inlet louver apparatus, and the section 206 may include a drift elimination apparatus. In some instances, the contact zone 104 may include a drift eliminator apparatus, and the section 206 may include an inlet louver apparatus. In some instances, the contact zone 104 and the packing 204 may include a drift eliminator apparatus and an inlet louver apparatus, respectively, and the section 206 is optionally included in the system 1100.

Hydration solution stream 108 flowing down the contact zone 104, as well as any non-evaporated hydration solution that has been collected by the gas inlet section 102, the drift elimination section 206 or a combination thereof, is discharged into the hydration solution collection basin 105. In some cases over time, the hydration solution in the hydration sub-system 1101, may become concentrated, as a result of the continual evaporation of pure water. In some cases, as a result of the evaporation process, the hydration solution may become concentrated with non-volatile components, including for example, metals, minerals, ions, suspended solids, organics, dissolved solids and the like. This concentrated solution and the concentrated non-volatiles may be periodically or continually removed from the basin as a slip stream 112, before the pump 113 recycles the hydration solution 108 back to the hydration solution distribution unit 103. The collection basin 105 may also be periodically or continually supplied with a makeup hydration solution stream 111. In some cases, the source of the makeup hydration solution stream 111 may include at least a portion of fresh water, non-potable water, waste water, gray water, rain or storm water, brackish water, saline water, sea water or the like. In some cases, the hydration solution distribution unit 103, may include at least a portion of a pressurized header system with nozzles to spray the hydration solution 108 onto the contact zone 104, a non-pressurized or atmospheric basin that feeds nozzles which operate using hydrostatic pressure or head, or a combination thereof.

After the non-evaporated hydration solution (e.g., hydration solution droplets) are removed by the drift elimination section 206, the gas stream 1110 enters the $CO_2$ capture packing 204 where the gas stream 1110 comes in contact with the $CO_2$ capture solution 208 which flows down from the distribution unit 203 through the $CO_2$ capture packing 204. At least a portion of the $CO_2$ present in the gas stream 1110 reacts with the $CO_2$ capture solution 208 in the $CO_2$ capture packing. $CO_2$ capture solution 208 along with the captured $CO_2$ flows through the $CO_2$ capture packing 204 and is collected in the collection basin 1105. From the basin, the $CO_2$ capture solution is either recycled in stream 208 to the $CO_2$ capture solution distribution unit 203 using pump 213 and flushed back over the $CO_2$ capture packing 204 or is sent as stream 212 for downstream processing, such as, for the recovery of captured $CO_2$. Finally, after having been humidified with water and then having the $CO_2$ removed the gas passes as stream 210 through the second drift elimination section 214 to prevent the escape of $CO_2$ capture solution 208 droplets. In some embodiments, the section 214 may contain drift eliminator apparatus, such that it can function to contain droplets of the $CO_2$ capture solution 208 from being carried away with the gas stream 210 into a downstream process or the atmosphere.

In some cases, the $CO_2$ capture solution collection basin 1105 may consist of a $CO_2$ capture solution level measurement device 1117, where the device 1117 is configured to measure the level of the $CO_2$ capture solution in the collection basin 1105. The measurement data can be used to control the operation of the sub-system 1101. In some aspects, this measurement data can be compared against a set point, such that, when the measurement data is higher than the set point, the sub-system 1101 is turned off, and when the measurement data is lower than the set point, the sub-system 1101 is turned on. In some cases this is done to indirectly control the water content of the $CO_2$ capture solution. In some aspects, the measurement data can be combined with data from other devices, such as the gas analysis unit device 817 (as described in FIG. 8), to control the operation of the sub-system 1101.

In some cases, the $CO_2$ capture system 1100 may include multiple hydration sub-systems 1101 coupled with multiple gas-liquid contactor sub-systems 1121. In some aspects, some of the hydration sub-systems are turned on, while the other hydration sub-systems are turned off, as described with reference to FIG. 2. In some cases, this may be based on feedback from measurement and control systems, such as device 1117 described above, and other systems as described in FIG. 8.

Figure 12A:
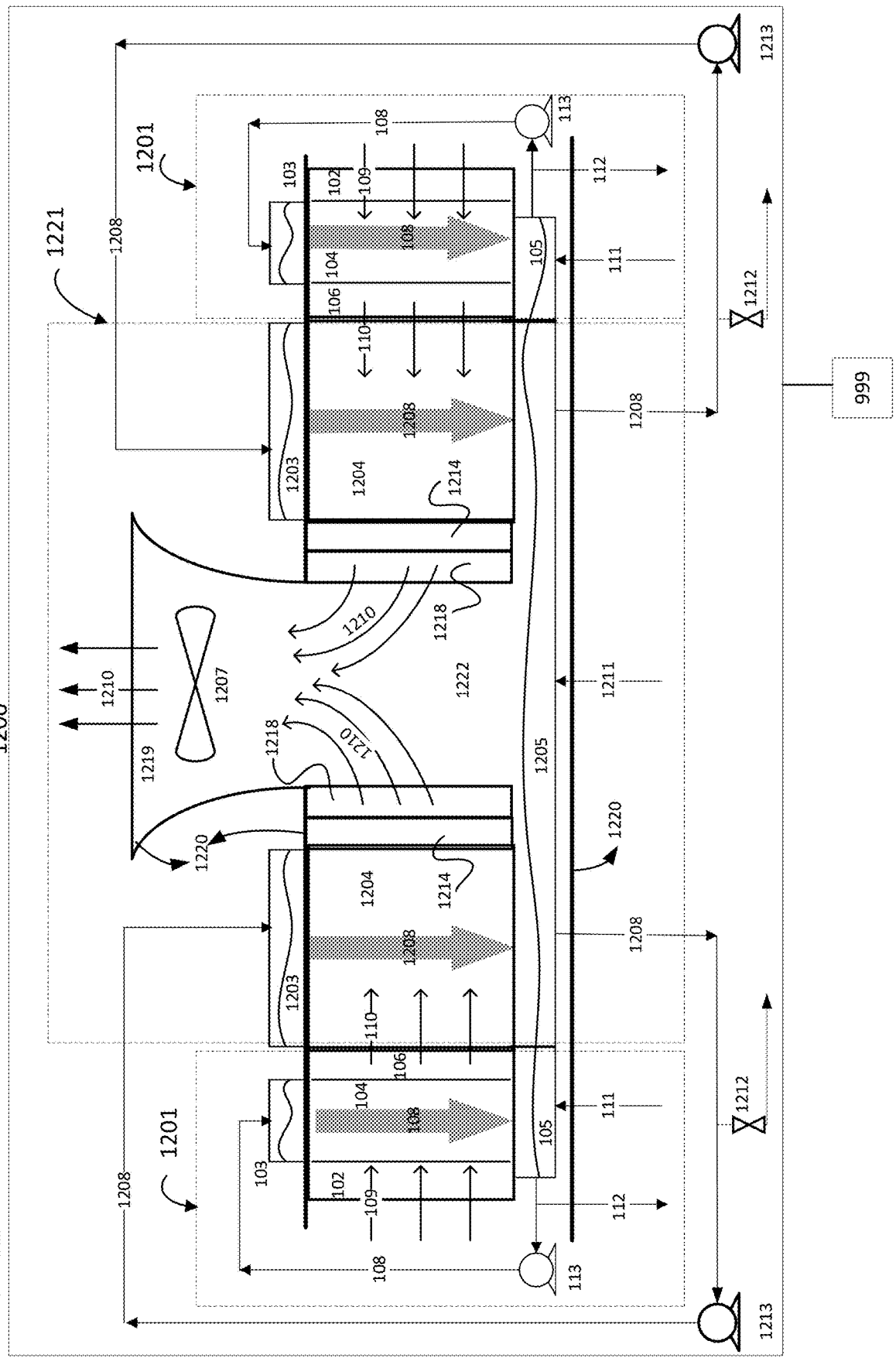
FIGS. 12A and 12B illustrate another example system and process for humidification of gases in association with a direct air capture system.

Referring to FIG. 12A, a $CO_2$ capture system 1200 includes hydration sub-systems 1201 coupled with a gas-liquid contactor sub-system 1221, where the sub-system 1221 is configured/purposed as a dual cross flow contactor for $CO_2$ capture. The hydration sub-systems 1201 includes gas inlet sections 102, contact zone 104, drift elimination sections 106, hydration solution distribution units 103, hydration solution collection basins 105 and pumps 113. The gas-liquid contactor sub-system 1221 includes $CO_2$ capture packings 1204, drift elimination sections 1214, $CO_2$ capture solution distribution units 1203, pumps 1213, a $CO_2$ capture solution collection basin 1205, sealants 1218, structural housing 1220, open plenum area 1222, fan cowling outlet 1219 and an induced draft fan 1207. In some aspects system 1200 may include a control system 999 communicably coupled to the components (illustrated or otherwise).

The sub-system 1221 described herein is shown as an induced flow dual cross flow gas-liquid contactor. In this configuration, the fan 1207 is located downstream of the contact zone 104 and drift elimination section 1214, and it functions to pull gas stream 109 into the system, through the gas inlet sections 102, contact zone 104 and the packing 1204, and drift elimination sections 1214 before leaving the via the fan cowling outlet 1219. The structural housing 1220 may include sealants 1218 and an open plenum area 1222. The edges of the draft elimination sections 1214 may be sealed against the structural housing 1220 using sealants 1218, such that there are substantially no air gaps or cracks. The sealants 1218 may be constructed of a flexible and air tight material, and will be chemically compatible and inert in regards to the $CO_2$ capture solution. An alternative configuration for sealants 1218 and the drift elimination sections 1214 has been shown in FIG. 12B. In this configuration, the drift elimination section 1214 is installed immediately below the fan cowling 1219 and the edges of the drift elimination section 1214 material are sealed against the structural housing 1220.

Figure 12B:
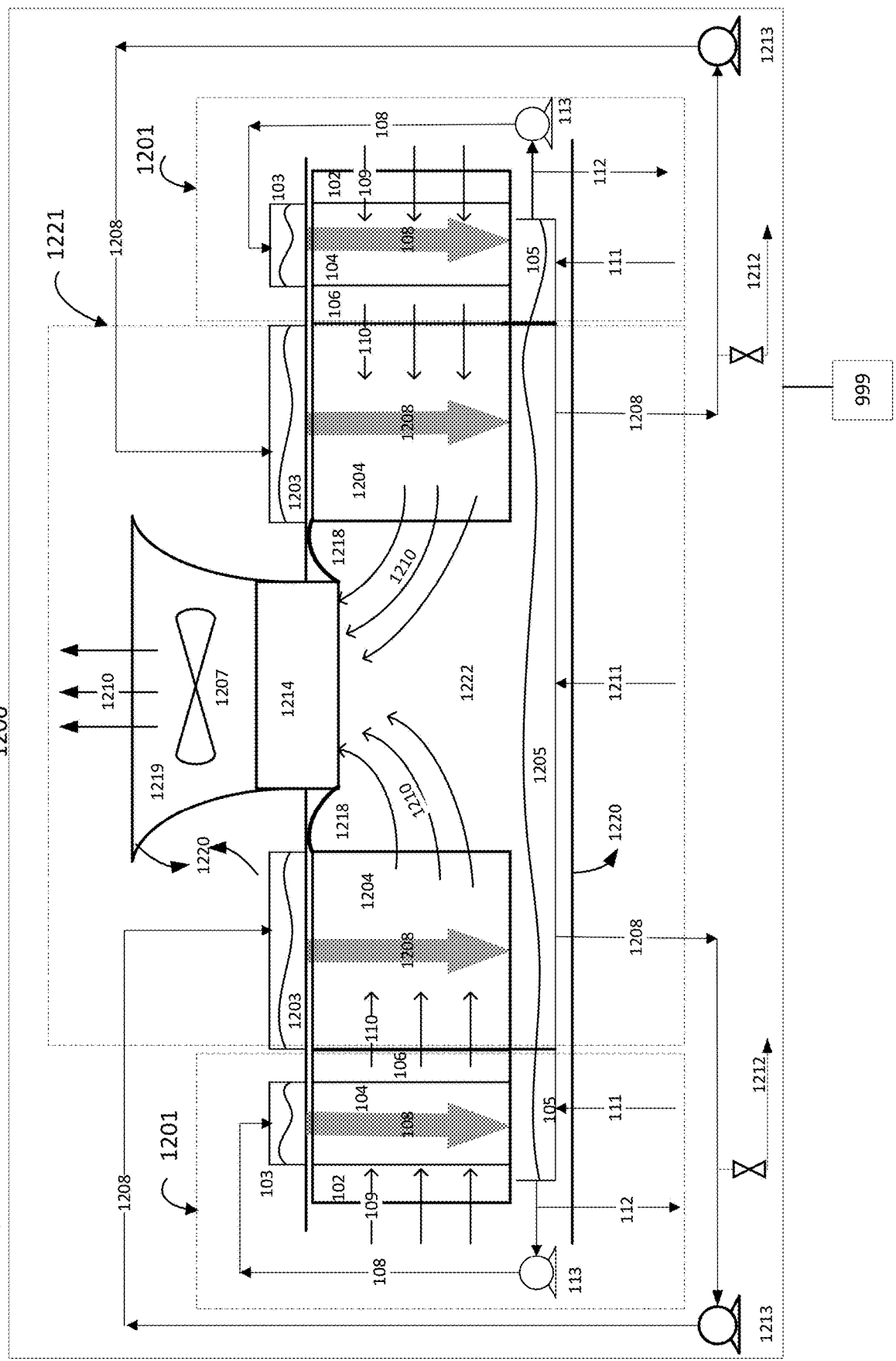

The notion of substantially no air gaps or cracks can mean that between 0-1% of the total outlet surface area is not directly covered by drift elimination section 1214. The outlet surface area is the area through which the gas stream 1210 being drawn through the system 1200 must move in order to exit the system, and may be located downstream of the $CO_2$ capture packing zone 1204. As shown in FIGS. 12A and 12B, the outlet surface area may include but is not limited to the area immediately adjacent to the packing 1204, the surface area immediately upstream of the fan 1207 and cowling 1219, and the area downstream of the packing 1204 but upstream of the plenum 1222.

In some cases, the sub-system 1221 includes apparatus and process solutions similar to direct air capture systems in existence to date. The $CO_2$ capture solution 1208 used in the sub-system 1221 is specifically selected for its ability to capture $CO_2$ from gas stream 109. Additionally, the amount and material of construction of contact zone 104 used in each of the sub-systems 1201 may be different than the $CO_2$ capture packing 1204, based on the distinctive characteristics and functions required in each of these systems. The main function of the hydration solution stream 108 used in each of the sub-systems 1201 is to humidify the gas stream 109 through evaporation of water from the hydration solution, and this hydration solution can be comprised of a variety of sources such as, non-potable water, sea water, saline water, brackish water, rain or storm water, gray water, waste water from either the downstream process or elsewhere, or a combination thereof. In some aspects, the $CO_2$ capture solution streams 1208 used in the sub-system 1221 can be any liquid that can remove at least some $CO_2$ from the gas streams 110, and can include alkaline solutions, such as, potassium hydroxide, sodium hydroxide, potassium carbonate and potassium bicarbonate; and can include additional components, such as catalysts and enzymes, to improve the $CO_2$ uptake of the liquid solution.

The function of the sub-systems 1201 is to pre-condition the gas streams 109 before they are sent to the sub-system 1221. In some aspects, each of the gas stream 109 is ambient air that moves through system 1200, and in some cases at least a portion of this movement may be generated using an induced draft fan 1207, which is a component of the gas-liquid contactor sub-system 1221. The gas streams 109 are humidified upon contacting the hydration solution streams 108 in each of the sub-systems 1201. In some aspects, this pre-conditioning helps to reduce evaporative losses from the $CO_2$ capture solution streams 1208 when they comes in contact with the gas streams 110. In some aspects, having the hydration sub-systems 1201 upstream of the gas-liquid contactor sub-system 1221 provides gas streams 110 to the sub-system 1221 such that water loss through evaporation is minimized from the $CO_2$ capture solution streams 1208 of the sub-system 1221. In some aspects, this could reduce the amount of fresh $CO_2$ capture solution make-up stream 1211 required in the gas-liquid contactor sub-system 1221. This $CO_2$ capture solution makeup stream 1211 may have restrictions on the types of non-water content, including for example the types of ionic species, dissolved and suspended solids, metallic, mineral and organic matter, and the like. These non-water components may have undesirable effects on process performance of sub-system 1221, and as such need to be restricted from entry into sub-system 1221. Directly adding non-process liquid into sub-system 1221, from sources such as those listed as acceptable for sub-systems 1201, may not be desirable or possible. Additionally, in some aspects where sub-system 1221 is operating in hot, dry climates, and/or where it might be desirable to conserve potable or clean water, using sub-systems 1201 with alternate water sources, such as those used for the hydration solution streams 108, as a means of preventing process solution, e.g., $CO_2$ capture solution evaporation from sub-system 1221 allows for the use of alternate water sources without incurring the problems associated with using these sources directly in sub-system 1221.

In each of the sub-systems 1201, the gas stream 109 is passed through a gas inlet section 102, and into the contact zone 104. In some aspects, the contact zone 104 comprises of at least one or more of a packing, splash bars, trays, or spray nozzles. In some aspects, the gas inlet section 102 is an inlet louver that is used to keep the hydration solution 108 that is moving from the distribution unit 103 through the contact zone 104 and into the collection basin 105, from splashing out of the hydration sub-system 1201. After passing through the gas inlet section 102, the gas enters the contact zone 104, which is wetted with the hydration solution 108 flowing down from the hydration solution distribution unit 103, through the contact zone 104 and discharging into the hydration solution collection basin 105. In the contact zone 104, the gas stream 109 is contacted with the hydration solution 108 and exits the contact zone 104 as a gas stream 110, which is partially or fully saturated with at least a portion of evaporated hydration solution 108. In some cases, the extent of saturation of gas stream 109 can be a function of the ambient temperature, the temperature of hydration solution stream 108, surface area of the contact zone 104, and other thermodynamic factors. The partially or fully saturated gas stream 110 exits the respective sub-system 1201 through the drift elimination unit 106, which prevents any non-evaporated hydration solution (e.g., hydration solution droplets) from being carried out of hydration sub-system 1201 by the gas streams 110. In some aspects, the drift elimination sections 106 prevents hydration solution droplets from leaving the hydration sub-systems 1201 and entering the downstream sub-system 1221. In some implementations, sections 106 may contain drift eliminator apparatus, inlet louver apparatus similar to that described in unit 102, or a combination thereof, such that it can function to contain the hydration solution 108 within the contact zone 104 and $CO_2$ capture solution 1208 within the $CO_2$ capture packings 1204 to minimize or eliminate cross-contamination of both the solutions. In some cases, the section 106 may be designed to reduce the pressure drop across it, by optimizing the portion allocated to drift eliminator function versus inlet louver function.

In some instances, in each of the sub-system 1201, parts of the drift elimination section 106 may be a component of the contact zone 104 or the packings 1204. In some instances, the packings 1204 may include an inlet louver apparatus, and the sections 106 may include drift eliminator apparatus. In some instances, the contact zones 104 may include drift eliminator apparatus, and the sections 106 may include inlet louver apparatus. In some instances, contact zones 104 and the packings 1204 may include drift eliminator apparatus and inlet louver apparatus, respectively, and the sections 106 are optionally included in the system 1200.

Hydration solution streams 108 flowing down the contact zone 104, as well as any non-evaporated hydration solution that has been collected by the gas inlet sections 102, the drift elimination sections 106 or a combination thereof, is discharged into the hydration solution collection basins 105. In some cases over time, the hydration solution in each of the hydration sub-systems 1201, may become concentrated, as a result of the continual evaporation of pure water. In some cases, as a result of the evaporation process, the hydration solution may become concentrated with non-volatile components, including for example, metals, minerals, ions, suspended solids, organics, dissolved solids and the like. This concentrated solution and the concentrated non-volatiles may be periodically or continually removed from the respective basins 105 as slip streams 112, before the pumps 113 recycle the hydration solution streams 108 back to the hydration solution distribution units 103. The collection basins 105 may also be periodically or continually supplied with makeup hydration solution streams 111. In some cases, the source of the makeup hydration solution streams 111 may include at least a portion of fresh water, non-potable water, waste water, gray water, rain or storm water, brackish water, saline water, sea water or the like. In some cases, each of the hydration solution distribution units 103, may include at least a portion of a pressurized header system with nozzles to spray the hydration solution streams 108 onto the contact zones 104, a non-pressurized or atmospheric basin that feeds nozzles which operate using hydrostatic pressure or head, or a combination thereof.

After the non-evaporated hydration solution (e.g., hydration solution droplets) are removed by the drift elimination sections 106, the gas streams 110 enters the $CO_2$ capture packings 1204 where the gas streams 110 comes in contact with the $CO_2$ capture solution streams 1208 which flows down from the distribution units 1203 through the $CO_2$ capture packings 1204. At least a portion of the $CO_2$ present in the gas streams 110 reacts with the $CO_2$ capture solution 1208 in the $CO_2$ capture packings. $CO_2$ capture solution 1208 along with the captured $CO_2$ flows through the $CO_2$ capture packings 1204 and is collected in the collection basin 1205. From the basin, the $CO_2$ capture solution is either recycled in streams 1208 to the $CO_2$ capture solution distribution units 1203 using pumps 1213 and flushed back over the $CO_2$ capture packings 1204 or is sent as streams 1212 for downstream processing, such as, for the recovery of captured $CO_2$. Finally, after having been humidified with water and then having the $CO_2$ removed the gas streams pass as streams 1210 through the second drift elimination sections 1214 to prevent the escape of $CO_2$ capture solution 1208 droplets. In some embodiments, the sections 1214 may contain drift eliminator apparatus, such that it can function to contain droplets of the $CO_2$ capture solution 1208 from being carried away with the gas streams 1210 into a downstream process or the atmosphere.

In some cases, the $CO_2$ capture system 1200 may include one or more measurement and control systems (as described in FIGS. 8 AND 11). In some aspects, one or more of the hydration sub-systems 1201 may be turned off or on, based at least in part on the feedback from the control systems.

A number of embodiments of the invention have been described. Nevertheless, it will be understood that various modifications may be made without departing from the spirit and scope of the invention. Accordingly, other embodiments are within the scope of the following claims. Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description. Changes may be made in the elements described herein without departing from the spirit and scope as described in the following claims.

What is claimed is:

1. An apparatus for humidifying a gas stream, comprising:
   inlet ports arranged to receive at least one feed stream into a hydration housing vessel;
   a gas inlet section configured to receive at least one gas feed stream into the hydration housing vessel, the inlet ports and the gas inlet section coupled to the hydration housing vessel;
   a hydration solution having a capacity for hydrating the at least one gas feed stream;
   a contact zone coupled to the hydration housing vessel and configured for gas-liquid contact;
   a solution distribution system coupled to the hydration housing vessel and comprising a pump configured for flowing the hydration solution over at least a portion of the contact zone;
   a hydration solution collection basin coupled to the hydration housing vessel and configured to receive the hydration solution leaving the contact zone;
   a drift elimination section coupled to the hydration housing vessel and configured to prevent hydration solution from leaving with a humidified gas stream;
   at least one outlet coupled to the hydration housing vessel and configured to dispense the humidified gas stream;
   at least one outlet port coupled to the hydration housing vessel and configured to discharge at least a portion of the hydration solution;
   a $CO_2$ capture packing section;
   a capture solution drift elimination section; and
   an open plenum at least partially delimited by the capture solution drift elimination section, the at least one gas feed stream configured to flow sequentially through the gas inlet section, the contact zone, the drift elimination section, the $CO_2$ capture packing section, the capture solution drift elimination section and into the open plenum.

2. The apparatus of claim 1, wherein the contact zone comprises packing material comprising at least one of loose fill or structured fill.

3. The apparatus of claim 1, wherein the apparatus is coupled to a downstream process, and at least a portion of a humidified gas stream exiting the apparatus is fluidly connected to the downstream process.

4. The apparatus of claim 3, wherein the drift elimination section is configured to isolate the hydration solution from the downstream process, and comprises one or more of drift eliminators, inlet louvers, demisters, or a combination thereof.

5. The apparatus of claim 3, wherein the downstream process comprises at least one of a fan or blower configured to move at least a portion of the humidified gas stream through the apparatus, and into the downstream process.

6. The apparatus of claim 5, wherein the fan or blower comprises a fan cowling defining a fan cowling outlet, the fan cowling outlet positioned vertically above the solution distribution system.

7. The apparatus of claim 3, wherein the downstream process comprises a process solution, a process solution evaporator unit, and a condenser and collection unit configured to evaporate and collect water from at least a portion of the process solution.

8. The apparatus of claim 3, wherein one or more of the apparatus and the downstream process are fluidly connected to a water treatment and filtration system.

9. The apparatus of claim 3, comprising a temperature control system configured to control the temperature of the hydration solution, wherein the temperature control system comprises at least one of a heat exchanger and a gas analysis unit.

10. The apparatus of claim 3, comprising:
    a control system coupled to the apparatus and the downstream process; and
    at least one process solution level measurement device coupled to the apparatus and the downstream process, the control system being configured to perform operations comprising:
    receiving an output from the at least one process solution level measurement device; and
    controlling, based on the received output, a water content of the downstream process.

11. The apparatus of claim 1, wherein the hydration solution collection basin comprises:
    at least one or more solid collection zones; and
    a solids transfer system coupled to the hydration solution collection basin and configured to remove solid material from the at least one or more solid collection zones.

12. The apparatus of claim 11, wherein the solids transfer system comprises at least one of an auger, screw conveyor, progressive cavity pump, screw pump, high density solids pump, or reciprocating pump.

13. The apparatus of claim 11, wherein the hydration solution collection basin comprises an inclined bottom basin area and a liquid level, wherein the inclined bottom basin area is sloped down towards the at least one or more solid collection zones.

14. The apparatus of claim 1, wherein the drift elimination section further comprises:
    a pre-fabricated mechanical frame; and
    a drift eliminator material coupled to the pre-fabricated mechanical frame.

15. The apparatus of claim 14, comprising a flexible sealant pressed against the drift eliminator material configured for sealing the hydration housing vessel and the drift eliminator material.

16. The apparatus of claim 1, wherein the hydration solution comprises non-potable water, off-spec water, brackish water, saline water, sea water, waste water, gray water, rain water, storm water, non-process water, or a combination thereof.

17. The apparatus of claim 1, comprising a $CO_2$ capture solution collection basin configured to receive $CO_2$ capture solution from the $CO_2$ capture packing section, the hydration solution collection basin being positioned adjacent to the $CO_2$ capture solution collection basin and fluidly separated therefrom;
- the hydration solution collection basin being fluidly coupled to the pump; and
- the $CO_2$ capture solution collection basin being fluidly coupled to a capture solution pump.

18. The apparatus of claim 17, wherein:
- the pump is configured to flow the hydration solution from the hydration solution collection basin to the contact zone; and
- the capture solution pump is configured to flow the $CO_2$ capture solution from the $CO_2$ capture solution collection basin to the $CO_2$ capture packing section.

19. The apparatus of claim 17, comprising:
- a hydration solution makeup in fluid communication with the hydration solution collection basin; and
- a $CO_2$ capture solution makeup in fluid communication with the $CO_2$ capture solution collection basin.

20. The apparatus of claim 17, wherein the $CO_2$ capture solution comprises a hydroxide or an amine.

21. The apparatus of claim 17, wherein the $CO_2$ capture solution collection basin is at least partially positioned beneath the $CO_2$ capture packing section.

22. The apparatus of claim 21, wherein the $CO_2$ capture solution collection basin is positioned beneath the open plenum.

23. The apparatus of claim 1, comprising a dual-cell, cross-flow gas-liquid contactor, the gas-liquid contactor comprising the open plenum and an induced-draft fan disposed above the open plenum.

24. The apparatus of claim 23, wherein:
- the contact zone comprises a first contact zone and a second contact zone;
- a first hydration solution collection basin is positioned below the first contact zone; and
- a second hydration solution collection basin is positioned below the second contact zone.

25. The apparatus of claim 1, wherein the $CO_2$ capture packing section is configured for capturing $CO_2$ from air.

26. The apparatus of claim 1, wherein the $CO_2$ capture packing is adjacent to the hydration housing vessel and downstream of the hydration housing vessel relative to a direction of flow of the at least one gas feed stream.

27. The apparatus of claim 1, wherein the solution distribution system is positioned above the hydration housing vessel.

28. The apparatus of claim 1, comprising a $CO_2$ capture solution distribution unit positioned above the $CO_2$ capture packing section.

29. The apparatus of claim 28, wherein the $CO_2$ capture solution distribution unit abuts a top portion of the $CO_2$ capture packing section.

30. The apparatus of claim 1, comprising at least one seal positioned between the capture solution drift elimination section and a structural housing of the apparatus.

31. The apparatus of claim 30, wherein the at least one seal abuts the capture solution drift elimination section and is positioned downstream thereof relative to a direction of flow of the at least one gas feed stream.

\* \* \* \* \*